United States Patent [19]

Kimbrough

[11] Patent Number: 5,046,067
[45] Date of Patent: Sep. 3, 1991

[54] DIGITAL TRANSMISSION SYSTEM
[75] Inventor: Mahlon D. Kimbrough, Norcross, Ga.
[73] Assignee: Reliance Comm/Tec Corporation, Chicago, Ill.
[21] Appl. No.: 547,430
[22] Filed: Jul. 2, 1990

Related U.S. Application Data

[63] Continuation of Ser. No. 261,771, Oct. 24, 1988, abandoned.
[51] Int. Cl.$^5$ ................................ H04J 3/12
[52] U.S. Cl. .................... 370/110.1; 370/56; 370/68; 370/68.1
[58] Field of Search ............... 370/13, 68, 68.1, 110.1, 370/111, 56, 58.1, 58.2, 58.3, 66, 79, 84, 110.2; 379/253, 284, 350, 353, 356, 357

[56] References Cited

U.S. PATENT DOCUMENTS

| | | | |
|---|---|---|---|
| 4,059,731 | 11/1977 | Green et al. | 370/13 |
| 4,232,386 | 11/1980 | McDonald et al. | 370/68 |
| 4,245,340 | 1/1981 | Landry | 370/111 |
| 4,270,030 | 5/1981 | Brolin et al. | 370/13 |
| 4,271,509 | 6/1981 | Brolin | 370/110.1 |
| 4,377,859 | 3/1983 | Dunning et al. | 370/68 |
| 4,394,756 | 7/1983 | Canniff | 370/110.1 |
| 4,520,477 | 5/1985 | Wen | 370/111 |
| 4,636,584 | 1/1987 | Binkerd et al. | 370/110.1 |

FOREIGN PATENT DOCUMENTS

| | | | |
|---|---|---|---|
| 1162278 | 2/1984 | Canada | 370/68 |
| 0025225 | 3/1981 | European Pat. Off. | 370/68 |

Primary Examiner—Douglas W. Olms
Assistant Examiner—Alpus H. Hsu
Attorney, Agent, or Firm—Michael M. Rickin

[57] ABSTRACT

A digital transmission system which serves a multiplicity of subscribers by a multiplicity of channel units. Each channel unit serves up to two subscribers. At each end of the system, there is included a signaling processing unit (SPU) which provides both time slot interchanging and change in format for the signaling information. At each end of the system, there is another unit (TRU) which provides time slot interchanging for the nonsupervisory information for each subscriber. The channel units are arranged in channel banks for four groups of units each. Each channel bank is connected to the SPU by two single lines over one of which all the supervisory (signaling, provisioning and testing) information for the units in the bank is transmitted and over the other of which all the supervisory information from the units is transmitted. The TRU is connected to each group in the bank by a pair of lines.

27 Claims, 9 Drawing Sheets

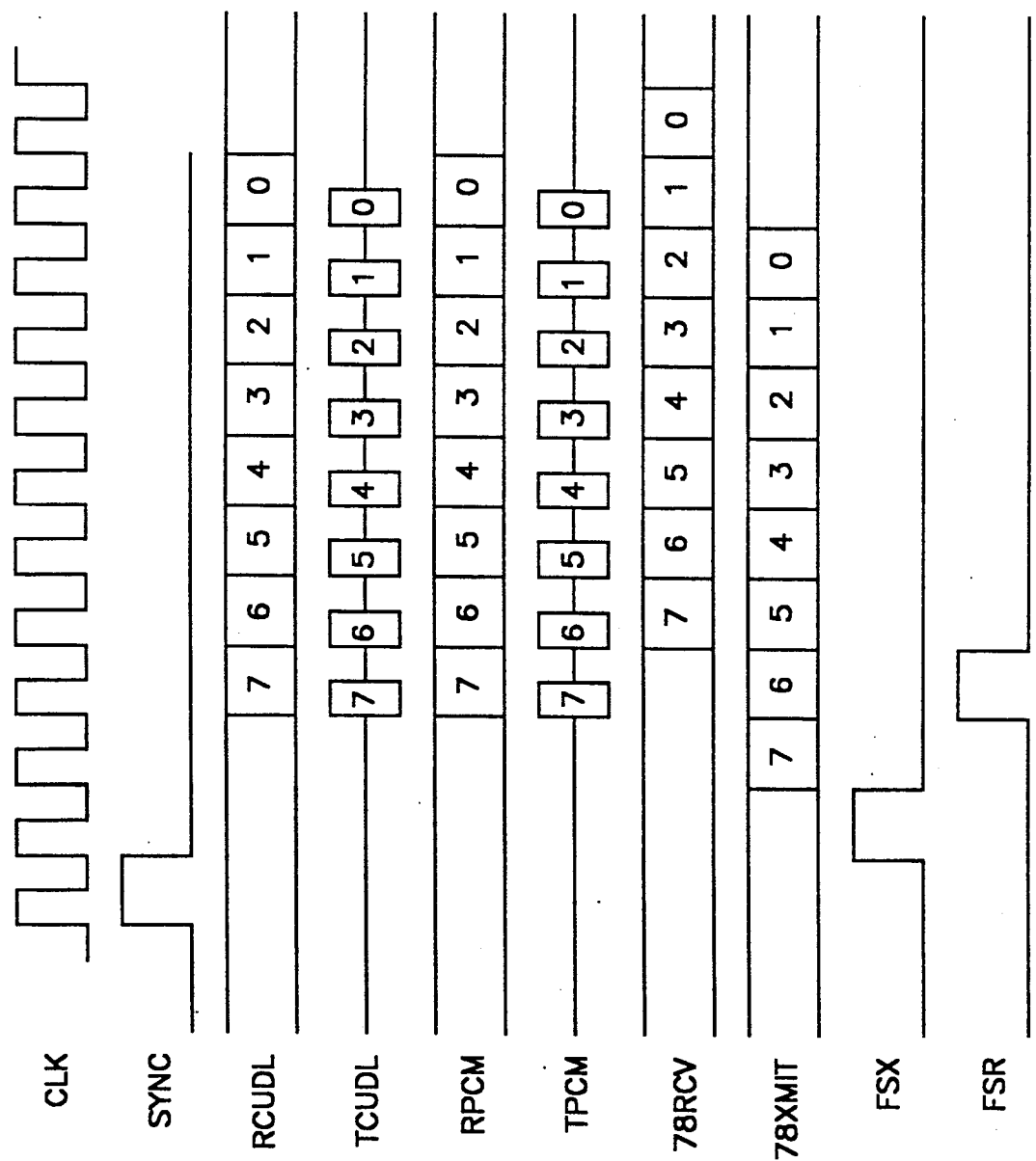

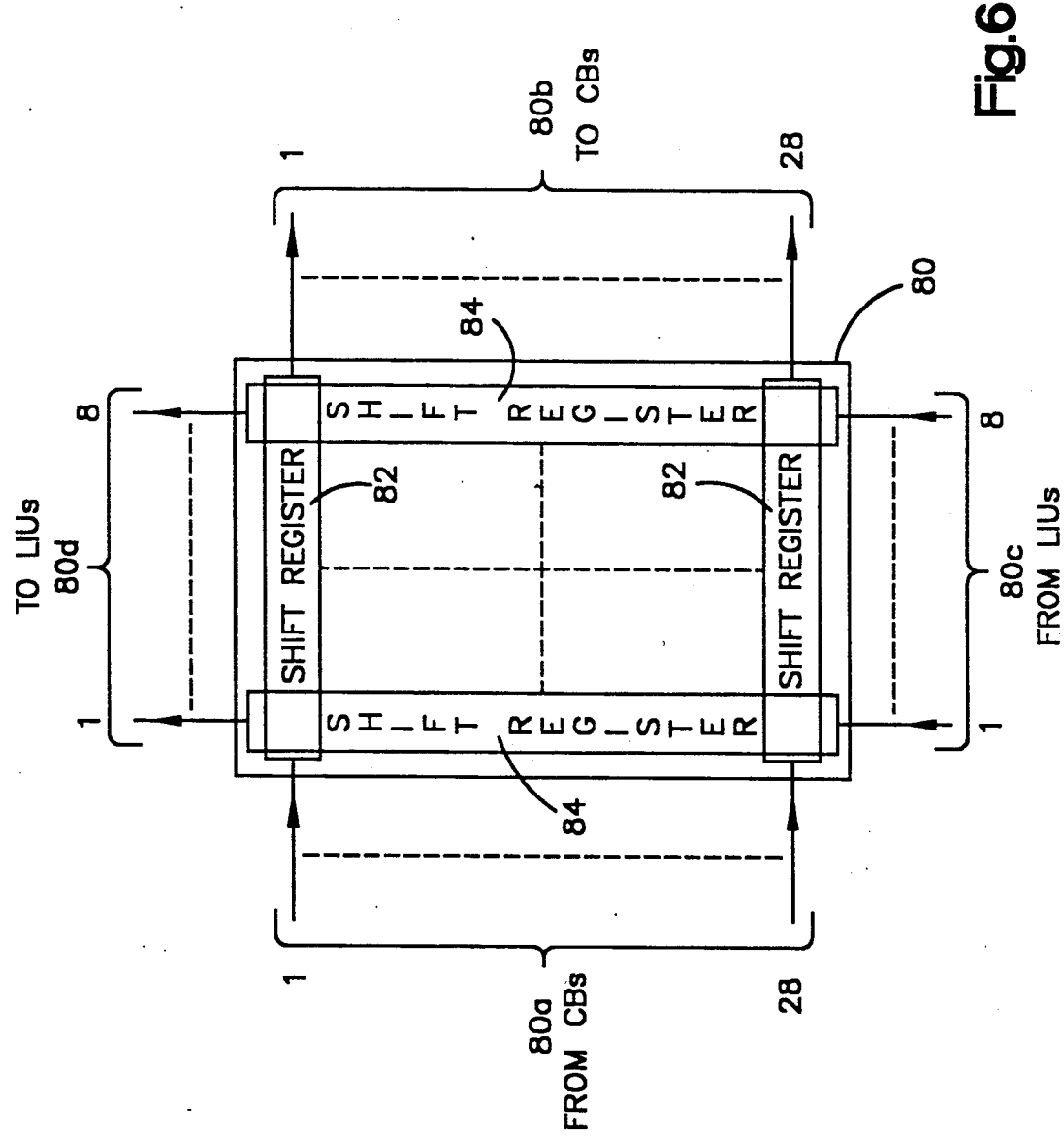

DIGITAL TRANSMISSION SYSTEM

This is a continuation of co-pending application Ser. No. 07/261,771 filed on Oct. 24, 1988, now abandoned.

BACKGROUND OF THE INVENTION

1. Field of the Invention

This invention relates to digital loop carrier systems and more particularly to various circuits for use therein.

2. Description of the Prior Art

Digital loop carrier systems which provide service between a multiplicity of subscribers and a telephone central office are known.

Typically, one or more subscribers are served by an electronic circuit, sometimes known as a channel unit, which provides an interface between those subscribers and the carrier system. Identical channel units are also located at the central office end of the system. While the number of subscribers served by each channel unit depends on the system architecture, a typical system servicing N subscribers has M channel units, where M is less than or equal to N.

Among the information sent by each subscriber to the central office and from the central office to the subscriber is that related to signaling. The central office must know whether each subscriber's telephone is on-hook or off-hook. The central office must send to the subscriber end of the system an indication relating to the ringing of each individual subscriber's telephone when a call has been placed to the subscriber through the system.

In earlier digital loop carrier systems, the signaling information (on/off hook, ringing) was defined at the channel units. Signaling which conveys information relating to on/off hook and ringing status requires the use of only two bits, i.e., four states. This type of signaling is known in the telephone industry as A, B signaling. In one prior art digital loop carrier system, the signaling information is sent to all of the channel units over a single line. Two other leads which are also connected to all of the channel units identify the signaling information as either A or B signaling. In addition, each of the channel units are physically wired to a channel decode block, i.e. there are address lines which are physically wired to each channel unit.

Digital loop carrier systems have become increasingly complex. This complexity has allowed larger number of subscribers to be served by the same system. Additional signaling state formats have been defined for those new systems. Further changes in transmission format standards have caused even more signaling state formats to be defined. Continuing to define the signaling information at the channel units requires a specially designed unit for each such defined signaling state format. In the context of the system described above, this also means that the channel unit card have thereon the circuitry to decode and utilize the particular signaling state format being used in the system. Alternatively, in that prior art system, it might be possible to design a single channel unit to be utilized with all known signaling state formats but such a channel unit would be quite complex.

It is, however, desirable to design a carrier system which is capable of use with any one of a number of different transmission format standards. Rather than specifically design a channel unit for each such standard or alternatively try to design a channel unit which can interface with all known standards, it is also desirable to have a system which is flexible in that it can be used with any one of a number of different defined signaling state formats. The carrier system of the present invention allows for that flexibility in that there is included therein an adaptable signaling processing unit (SPU).

The increasing complexity of digital loop carrier systems has also allowed many different types of subscribers to be served by the same system. This means that such systems have a large number of different types of channel units which can be inserted in the system in order to serve the subscriber. The particular type of channel unit inserted depends on the service needed by the subscriber. In order to keep the number of different types of channel units within reason, the channel units have the capability of being adjustable depending on the subscriber's needs. That adjustability may for example relate to the amount of gain to be provided to the subscriber.

In the prior art digital loop carrier system described above, the setting of those adjustable parameters can only be done in the field at the time the channel unit is plugged in to the slot associated with that subscriber. Such setting of the adjustable parameters is known as "provisioning". In the known carrier system, that provisioning is provided by making certain changes on the channel unit such as the setting of various dip switches on the card or moving jumpers. For that system, an installer is given an installation order indicating the particular subscriber for which the card is to be inserted, the type of card and the provisioning therefor. The installer then drives to the remote location which services that subscriber. The installer then sets the dip switches and inserts the card. The card must then be tested from the central office and in order for that to be done, the installer must place a telephone call to the office. As can be seen, the providing of service to new subscribers in the prior art digital loop carrier system is very labor intensive.

It is, however, desirable to design a digital carrier system which has the ability to both provision and test the channel units from the central office. It is also desirable to provide that provisioning and testing information to and from the particular channel unit over the same path which is used to provide the signaling to the channel unit. In order to provide all of that information to and from the channel unit, it is necessary for the unit to receive and transmit several bytes. As described above, the prior art digital loop carrier system has separate lines for the A and B signaling. If that system were expanded in order to be able to transmit and receive from the channel unit the multiple number of bits associated with the several bytes of information needed, then that system would include a large number of lines between each channel unit and the common circuitry at the subscriber end of the system. That is most undesirable. The digital transmission system of the present invention allows for that multiple amount of information to be received by and transmitted from each channel unit over only two signal paths. In the system of the present invention those two paths are shared by a multiplicity of channels.

It is also desirable to design a digital carrier system which includes therein the flexibility for interchanging time slots not only for the signaling information but also for the encoded signals to and from the subscribers of the system. Each subscriber is served by an associated channel of the system. There are several channel sequences in use today. The prior art digital loop carrier system is designed to work with only one of those sequences. In order for that system to "talk" to another of the known sequences it is necessary for that system to be provided with a map which relates the sequence for which it is designed to the other sequence. That system does not have the capability to change the channel sequence by interchanging time slots.

The digital transmission system of the present invention allows such interchanging of time slots to occur for not only the signaling information but also for the encoded signals to and from the subscribers of the system. This ability to interchange time slots allows the system of the present invention to change its channel sequence so that it can be used with any one of a number of different defined sequences. This ability to interchange time slots also allows the system of the present invention to provide certain additional features, such as the ability to test one end of the system disconnected from the other end of the system, which the prior art digital loop carrier system is unable to provide.

SUMMARY OF THE INVENTION

A digital transmission system which serves a multiplicity of subscribers by a multiplicity of channel units. The system has two terminals which are interconnected to each other by transmission means.

The transmission means carriers supervisory information and nonsupervisory information for each of the channel units from one of the terminals to the other of the terminals and from the other terminal to the one terminal. The one terminal includes a channel bank which has one or more of the channel units. Each of the channel units are associated with a predetermined number of the subscribers served by the system. Interface circuitry is connected to the transmission means for receiving the supervisory and nonsupervisory information from the other terminal and for transmitting to the other terminal the supervisory and nonsupervisory information from the one terminal. A first sign singler data line is connected between the interface circuitry and the one channel bank. The first data line is for carrying from the interface circuitry to the one channel bank all of the supervisory information from the other terminal for the channel bank and not for carrying from the interface circuitry to the channel bank any of the nonsupervisory information from the other terminal for the channel bank. A second data line is connected between the interface circuitry and the channel bank. The second single data line is for carrying from the channel bank to the interface circuitry all of the supervisory information from that channel bank for the other terminal and not for carrying from the channel bank to the interface circuitry any of the nonsupervisory information from that channel bank for the other terminal.

The system also converts signaling state information received for all of the subscribers in one format to another format.

Each subscriber of the system has an associated predetermined format for signaling information. The transmission means carriers for all of the subscribers signalling information having for each subscriber an associated format which may be different than the predetermined format associated with each subscriber. The one terminal has circuitry which responds to all of the received signaling information for translating for each of the subscribers the transmission means carried signaling information format associated with each of the subscribers to the signaling information format associated with each of the subscribers.

In the system, each of the subscribers have an associated predetermined time slot for signaling information and an associated predetermined time slot for nonsupervisory information. The transmission means between the two terminals carries all of the subscriber signaling and nonsupervisory information. The transmission means carried signaling information has for each subscribers an associated time slot which may be different than the predetermined signaling information time slot associated with each of the subscribers. The transmission means carried nonsupervisory information has for each subscriber an associated time slot which may be different than the predetermined nonsupervisory information time slot associated with each of the subscribers. The one terminal has circuitry which responds to all of the received signaling and nonsupervisory information for interchanging for all of the subscribers:

i) the transmission means carried signaling information time slot associated with each of the subscribers to the predetermined signaling information time slot associated with each of the subscribers; and ii) the transmission means carried nonsupervisory information time slot associated with each of the subscribers to the predetermined nonsupervisory information time slot associated with each of the subscribers.

The system also includes a multiplicity of channel units. Each unit serves a predetermined number of subscribers. Each channel unit includes a circuit which is responsive to the digital signals transmitted in the system for determining when supervisory information related to each of the subscribers served by that channel unit is occuring. That circuitry also determines for which one of those served subscribers the information is for. That circuit then generates signals which are indicative of the occurrence of the information and the particular served subscriber. The channel unit also includes interface circuitry which is connected to a first data line. That line carries the supervisory information for all of the channel units connected to that line. The interface circuitry is responsive to the indicative signals and the digital signals for selecting from the data line only the supervisory information related to the subscribers served by that channel unit.

DESCRIPTION OF THE DRAWING

FIG. 5b shows the waveforms for various signals associated with a particular one of the CUs.

FIG. 6 is a simplified block diagram for one embodiment of the serial to parallel and parallel to serial converter used in the LIUs, TRU and SPU.

DESCRIPTION OF THE PREFERRED EMBODIMENT

Figure 1:
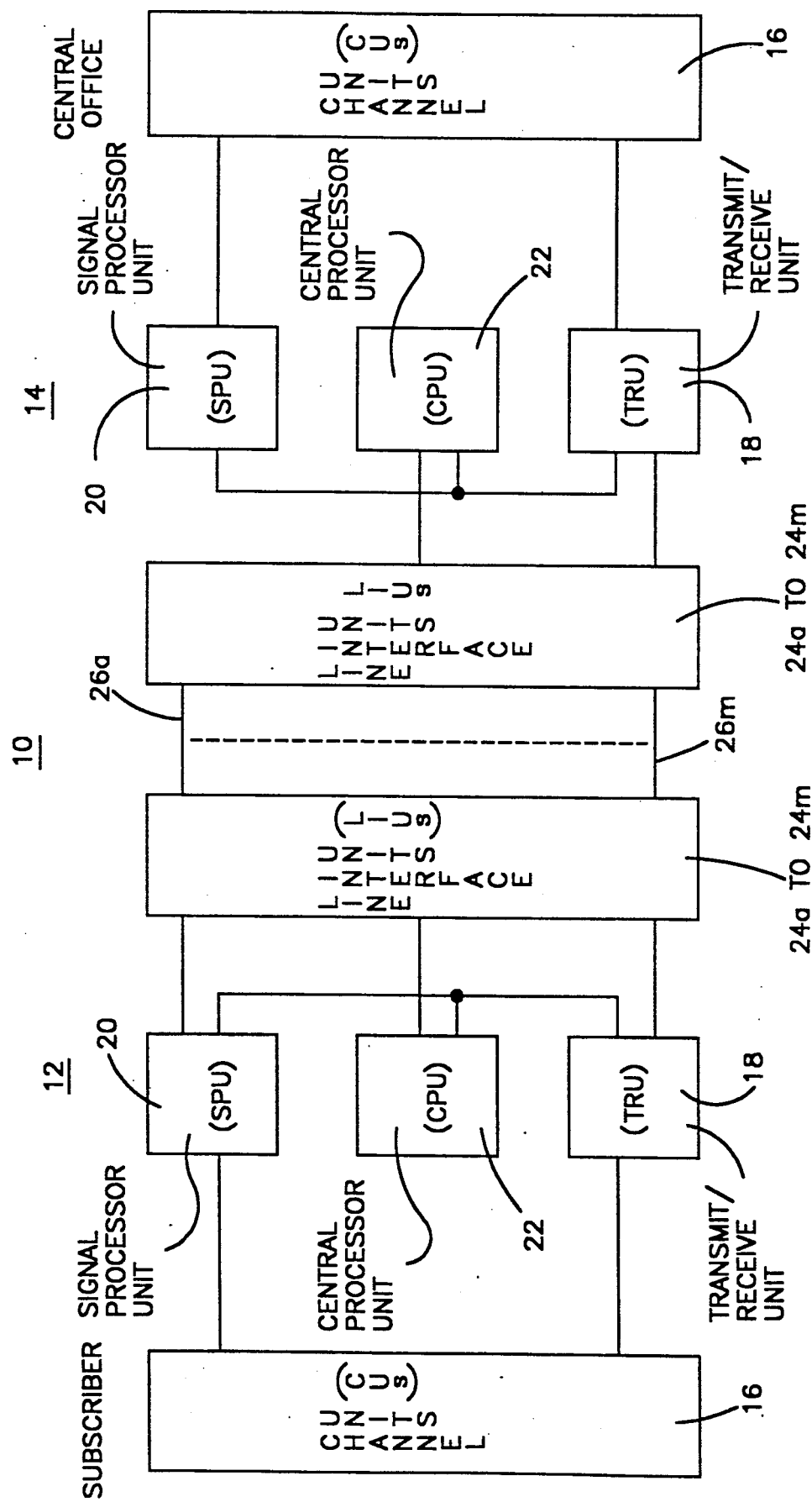
FIG. 1 is a block diagram of the digital loop carrier system of the present invention.

Referring now to FIG. 1, there is shown a block diagram of the digital loop carrier system 10 of the present invention. System 10 provides service between a multiplicity of subscribers (not shown) and a telephone central office (C.O.). System 10 is made of a multiplicity of units located at both the subscriber end 12 and central office end 14 of the system. As shown in FIG. 1, a unit which is located at the subscriber end 12 has a corresponding functionally identical unit located at the central office end 14. Therefore, these units will be described only with reference to the subscriber end 12 of system 10 with the understanding that unless otherwise indicated the same description holds for the central office end 14.

System 10 includes a multiplicity of channel units (CUs) 16 which are used to provide an interface for the analog signals received by and transmitted from the subscribers. The number of channel units 16 in system 10 depends upon the number of subscribers 12 served by the system. In general, a particular channel unit 16 can serve either one or two subscribers. The channel units 30 are connected to transmit/receive unit (TRU) 18 which is used to provide an interface between the order in which pulse code modulation (PCM) signals representing voice frequency transmissions are sent to and from the CUs 16 and the order in which those signals are transmitted to or received from C.O. end 14 of system 10.

System 10 further includes signal processor unit (SPU) 20 which as will be described in more detail hereinafter is designed in a manner such that it has the capability of storing the signaling state formats associated with all of the CUs 16. In addition thereto, SPU 20 is designed so that it also has the capability of storing the provisioning information associated with all of the CUs 16. SPU 20 is connected to the CUs 16 by only two data lines, one of which is associated with provisioning, signaling as well as testing information to be sent to the CUs and the other of which is associated with provisioning, signaling as well as testing information to be sent from the CUs. The signaling, provisioning and testing information is also known as the supervisory information and will be so referred to at various places hereinafter. SPU 20 has the capability to, on a periodic basis, refresh the provisioning and signaling information in each of CUs 16 and also provide testing information as required. Finally, SPU 20 has the capability to continually receive from central office 14 new provisioning, signaling and, as necessary, testing information for each of CUs 16.

System 10 further includes central processing unit (CPU) 22 which is used to provide control for both TRU 18 and SPU 20. The system further includes a multiplicity of line interface units (LIUs) 24a to 24m which are connected to the multiplicity of digital transmission lines 26a to 26m. The digital transmission lines interconnect the subscriber end 12 of system 10 with the central office end 14. LIUs 24a to 24m, as will be described hereinafter, provides the interface between the encoded signals on lines 26a to 26m to or from C.O. end 14. More specifically, LIUs 24a to 24m separate signaling information from the PCM signals representing voice frequency transmissions in the signals received on lines 26a to 26m from C.O. end 14 and combine the signaling information with the PCM signals representing voice frequency transmissions in the signals to be transmitted on lines 26a to 26m to C.O. end 14.

Figure 2:
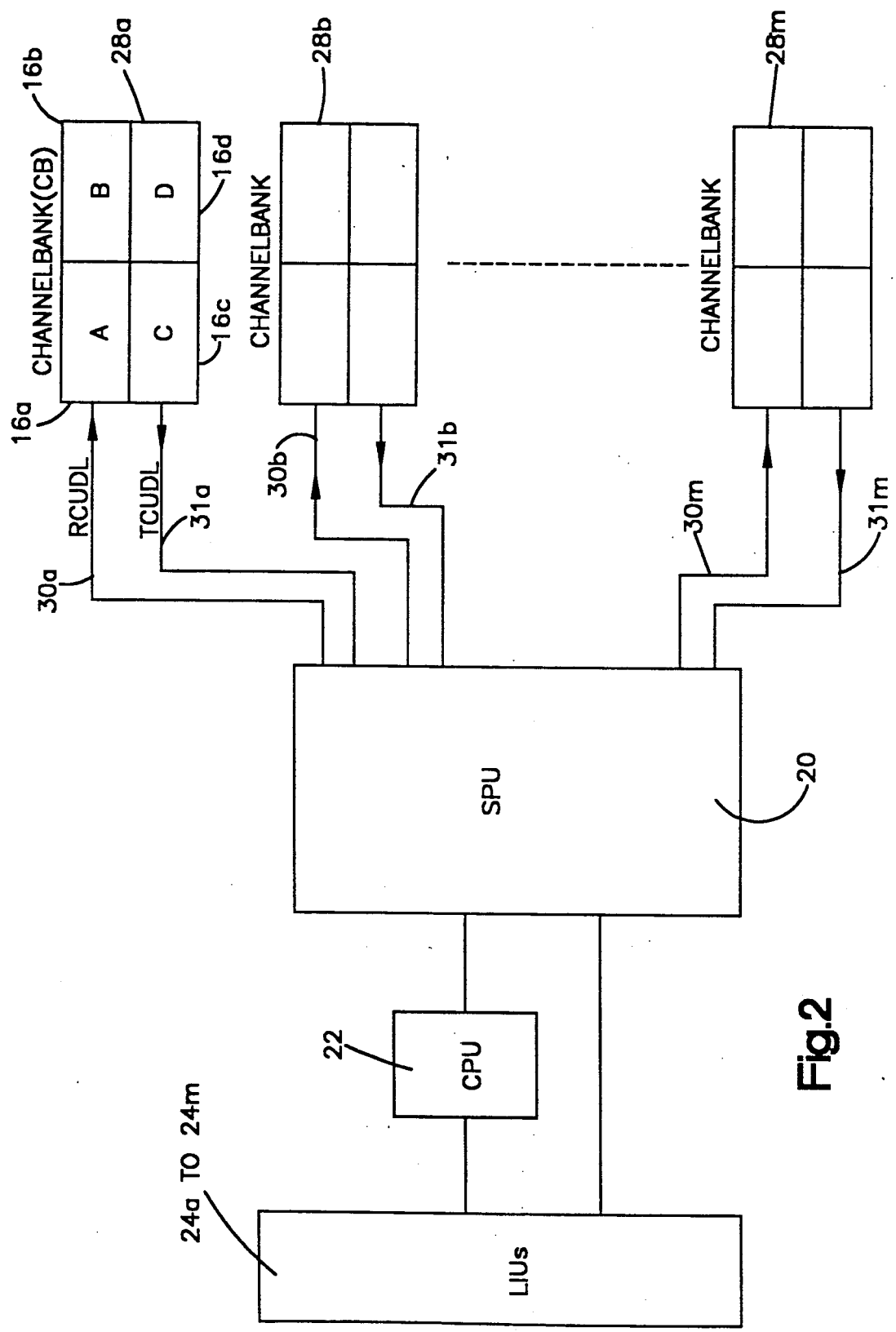
FIG. 2 is a block diagram which shows in further detail certain parts of the system shown in FIG. 1.

Referring now to FIG. 2, there is a block diagram which shows in further detail CUs 16, SPU 20, CPU 22 and LIUs 24a to 24m of system 10. As described above, system 10 can serve a multiplicity of subscribers. Each CU 16 may serve either one or two of those subscribers. System 10 must then include a multiplicity of CUs 16. The CUs may be arranged in a multiplicity of channel banks (CBs) 28a to 28m each capable of holding the same total number of CUs 16. The CUs 16 in each of channel banks 28a to 28m may be arranged in a multiplicity of equal groups, for example, the four groups 16a, 16b, 16c and 16d of FIG. 2. For ease of explanation hereinafter it will be assumed that each of CBs 28a to 28m has four such equal groups. The equal groups 16a, 16b, 16c and 16d in each of channel banks 28a to 28m will be referred to hereinafter as digroups A, B, C and D, respectively. For ease of illustration, only the digroups in channel bank 28a have been shown in FIG. 2.

Connected between SPU 20 and each of the CBs 28a to 28m are the associated pairs of lines in the two groups of data lines 30a to 30m and 31a to 31m. Line pair 30a, 31a are associated with CB 28a, line pair 30b, 31b are associated with CB 28b etc. As all of the line pairs function in an identical manner only the function of line pair 30a, 31a need be described hereinafter. That is only the line pair 30a, 31a associated with all of the CUs 16 in CB 28a will be described, it being understood that the other line pairs 30b, 31b; to 30m, 31m function in exactly the same manner with respect to all of the CUs 16 in the associated one of the CBs 28b to 28m. As used hereinafter the term CUs 16 unless indicated otherwise will refer only to the CUs 16 in CB 28a it being understood that the CUs 16 in the associated one of the CBs 28b to 28m function in exactly the same manner.

One line 30a of line pair 30a, 31a is used to carry signaling, provisioning and testing information, i.e. supervisory information from SPU 20 to all of the CUs 16 in CB 28a. The line 30a will be referred to hereinafter as the receive channel unit data link (RCUDL). The other line 31a of pair 30a, 31a is used to carry signaling, provisioning and testing information, i.e. supervisory information, from all of the CUs 16 in CB 28a to SPU 20. That line 31a will be referred to hereinafter as the transmit channel unit data link (TCUDL). The terms "transmit" and "receive" are defined with respect to the direction of information flow to or from the subscriber end 12 from or to the central office end 14, i.e., end 12 transmits information to end 14 and receives information therefrom.

Figure 3:
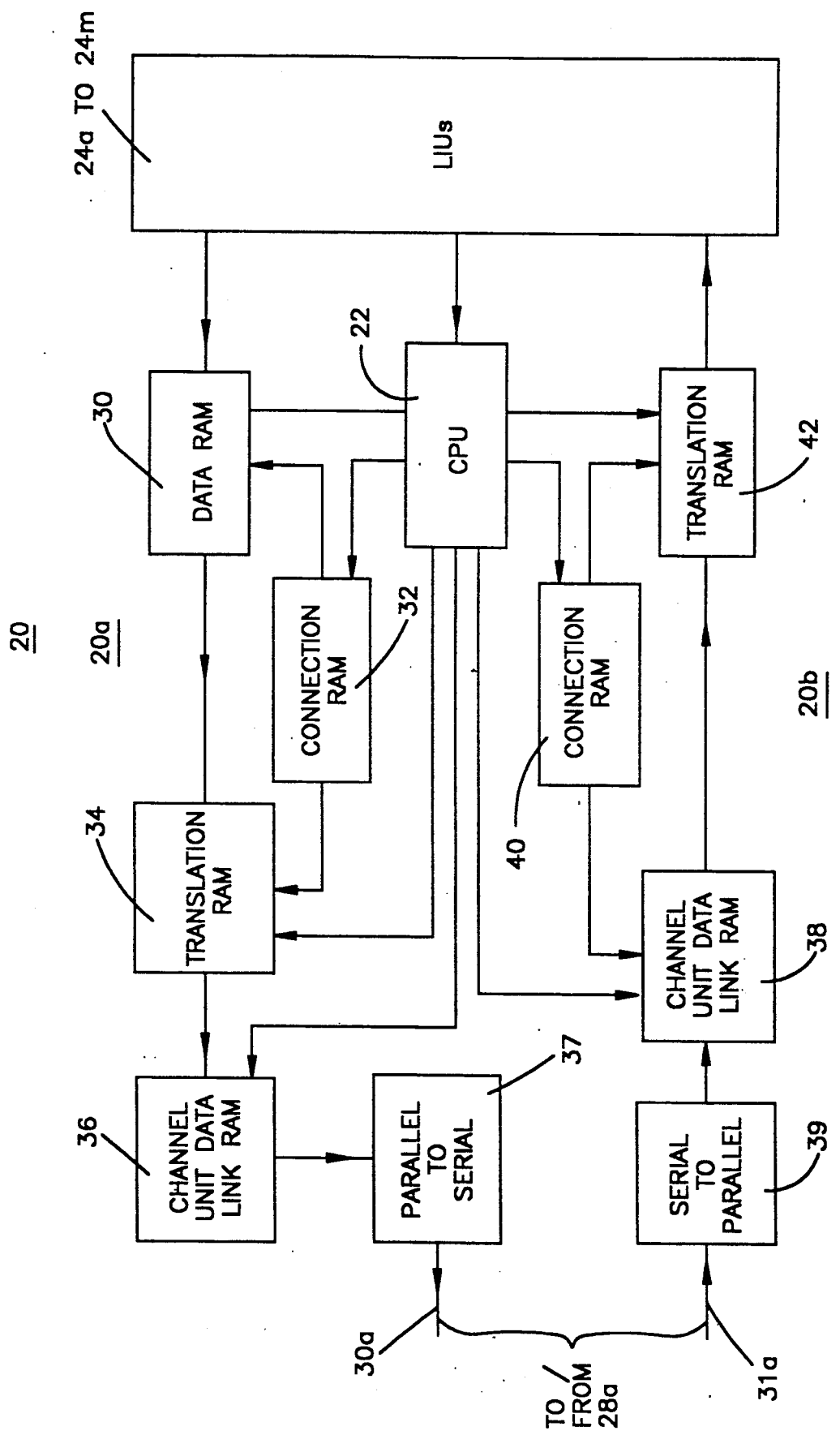
FIG. 3 is a simplified block diagram of the signaling processing unit (SPU) of the system of the present invention.

Referring now to FIG. 3, there is shown a simplified block diagram of SPU 20. SPU 20 may be divided into a receive signaling path 20a and a transmit signaling path 20b. As with FIG. 2, the terms "transmit" and "receive" as used herein are defined with respect to information flow to or from end 12 from or to end 14. The paths 20a and 20b include a number of random access memories (RAMs) whose function will be described in more detail hereinafter. The information necessary to address the locations in all of those RAMs originates from CPU 22. For ease of illustration, the various address busses associated with CPU 22 are shown in simplified from in FIG. 3.

As described above, SPU 20 must send to all of the CUs 16 in CB 28a signaling, provisioning and testing information. That information is received at SPU 20 from the C.O. end 14 of system 10 through the associated one of LIUs 24a to 24m. That information is sent to CB 28a over the RCUDL 30a. Receive signaling path 20a of SPU 20 includes data RAM 30, connection RAM 32, translation RAM 34, and channel unit data link (CUDL) RAM 36 all of which work in conjunction with CPU 22 to send that information to CB 28a. Receive signaling path 20a also includes parallel to serial converter 37 which connects the output of CUDL RAM 36 to RCUDL 30a.

Also as described above, all of the CUs 16 in CB 28a transmit to SPU 20 signaling, provisioning and testing information. In turn, SPU 20 transmits that information to the C.O. end 14 of system 10. More particularly, SPU 20 obtains that information from CB 28a over the TCUDL 31a. Transmit signaling path 20b of SPU 20 includes channel unit data link (CUDL) RAM 38, connection RAM 40 and translation RAM 42 all of which work in conjunction with CPU 22 to transmit that information through the associated one of LIUs 24a to 24m to C.O. end 14. Transmit signaling path 20b also includes serial to parallel converter 39 which connects TCUDL 31a to the input of CUDL RAM 38.

As described above, LIUs 24a to 24m are connected to C.O. end 14 by a multiplicity of digital transmission lines 26a to 26m. As is well known in the art, those digital transmission lines carry in a predetermined format encoded signaling information either to or from the CUs 16 of system 10. Provisioning and testing information is transmitted to C.O. end 14 or received therefrom by various means depending on the digital transmission format used in system 10. For example, if system 10 is of the type which uses the extended superframe format (ESF) then there is included in the digital signals on transmission lines 26a to 26m an embedded operations channel over which the provisioning and testing information is carried. If system 10 is not of the ESF type, then testing information is transmitted to and received from C.O. end 14 over a separate link. That link may be of the kind disclosed in U.S. Pat. No. 4,270,030. In any case, no matter how provisioning and testing information is received at SPU 20 from C.O. end 14 or transmitted thereto, it always passes through LIUs 24a to 24m. There are presently a number of well-defined signaling state formats and system 10 has the capability of adapting to any one of them. As will be described in more detail hereinafter, that adaptability arises from the design of SPU 20 and more particularly the use of translation RAM 34 in receive signaling path 20a and translation RAM 42 in transmit signaling path 20b.

Also, as is well known in the art, the information for each CU 16 carried on transmission lines 26a to 26m has its own time slot each of which is associated with a particular one of the subscribers of system 10. It is, however, desirable for system 10 to have the ability to interchange time slots as needed. In other words, there is not an unalterable one to one correspondence between a particular time slot and a particular subscriber. This ability to interchange time slots for the signaling information is also contained in SPU 20 and more particularly in connection RAM 32 of receive signaling path 20a and connection RAM 40 of transmit signaling path 20b. The circuitry necessary to interchange time slots for the PCM signals representative of voice frequency information is included in TRU 18 as will be described in more detail below.

As has been previously described, system 10 can serve a multiplicity of subscribers. Each of CUs 16 can serve one or two subscribers. Quite typically, when system 10 is first put into service the number of subscribers being served is well below the capacity of system 10. As more subscribers are added to system 10, additional CUs 16 are added to system 10. In addition, while subscribers may have various levels or types of service it is desirable for a limited number of different CUs 16 to be useable to provide those various levels or types of service. System 10 has the ability, from C.O. end 14, to "tell" a newly or even previously connected CU 16 the level or type of service it is to provide. Depending on the capability of the CU 16, it may not be necessary to physically remove and replace an already installed CU if the level of service to the subscriber(s) it serves is changed. That ability also resides in SPU 20 and more particularly in connection RAM 32 of receive signaling path 20a and connection RAM 40 of transmit signaling path 20b.

It is also desirable to test from C.O. end 14 the CUs 16. SPU 20 allows system 10 to have that capability. More particularly, it is CUDL RAM 36 of receive signaling path 20a and CUDL RAM 38 of transmit signaling path 20b which, respectively, receive from C.O. end 14 information for testing CUs 16 and transmit to C.O. end 14 information relating to the results of those tests.

A detailed description of the operation of SPU 20 will now be given. Receive signaling path 20a will first be described and then transmit signaling path 20b.

As described above, the signaling information is received by LIUs 24a to 24m from C.O. end 14 over transmission lines 26a to 26m. That information is written into data RAM 30. The address of the particular location in RAM 30 in which the signaling information is written is determined by CPU 22. The signaling information also includes some information which may be classified as "testing" information. For ease of discussion all of the information that is written into data RAM 30 will be referred to hereinafter as signaling information. The provisioning and testing information is also received by LIUs 24a to 24m in the manner described above. That information is then sent to CPU 22.

System 10 has a multiplicity of time slots, a multiplicity of LIUs 24a to 24m and a multiplicity of CUs 16. All of the CUs 16 in system 10 have their own unique address. That address is determined by the particular one of CBs 28a to 28m that the CU is associated with and the particular card slot in that CB into which the card is placed. Each of the card slots in each of the four digroups A, B, C, D of each of CBs 28a to 28m has its own unique physical address. As each of CUs 16 is first placed in a card slot at subscriber end 12, provisioning information is sent to SPU 20 from the C.O. end 14. Among other things, that provisioning information identifies the CU 16 with a particular one of the multiplicity of time slots and LIUs 24a to 24m. That part of the provisioning information is stored in connection RAM 32 in the form of a lookup table.

As described above, data RAM 30 stores the signaling information received from C.O. end 14. The signaling information may be in any one of a number of known formats or even in a format which was created after the installation of system 10. The signaling information is sent to all of the CUs 16 in CB 28a. Each CU in CB 28a responds only to that part of the signaling information which is associated with that CU. As will be described in more detail hereinafter in connection with FIGS. 5a to 5d there is a unique time slot for signaling, provisioning and testing information associated with each CU 16 in CB 28a. Each CU 16 uses its physical address as well as several timing signals to determine the occurrence of its time slot.

There is provided in translation RAM 34 a lookup table which translates the signaling information received from C.O. end 14 to the form necessary to be sent to the CUs 16 over RCUDL 30a. The information which is stored in the lookup table in translation RAM 34 comes from the provisioning information sent by C.O. end 14. As each CU 16 is connected in system 10, CPU 22 takes that part of the provisioning information which relates to signaling translation and places it in translation RAM 34. Under the control of CPU 22, the testing information is placed directly in CUDL RAM 36.

Also under the control of CPU 22 the signaling, provisioning and testing information to be sent over RCUDL 30a to all of the CUs 16 is assembled in CUDL RAM 36. That information is sent to the CUs 16 as a serial bit stream having a predetermined sequence. Parallel to serial converter 37 converts the parallel bit stream used in receive signaling path 20a to the serial bit stream to be sent over RCUDL 30a to all of the CUs 16.

The signaling information to be stored in data RAM 30 is received from C.O. end 14 as part of the digitally encoded signal sent from the C.O. There is a unique location or time slot in that signal for each subscriber to system 10. The signaling information is written into data RAM 30 in the order of receipt, which may not be the order of its transmission to CUs 16. That order, as described in more detail below, is determined by the provisioning information stored in connection RAM 32. In effect, data RAM 30 then acts as a buffer in that signaling information can be received from C.O. end 14 in a first order of time slots and sent to CUs 16 in a second order of time slots which may be the same as or different from the first time slot order.

The manner in which the provisioning information stored in the lookup table of connection RAM 32 functions to determine the interchanging of time slots will now be described. As CPU 22 addresses each location of the lookup table in connection RAM 32, the information stored therein is read out. Part of that information is used to address a unique location in data RAM 30. That location has stored in it the signaling information received for a particular one of the subscribers of system 10 from C.O. end 14. It should now be clear that by changing the information stored in connection RAM 32 another and different location in data RAM 30 can be addressed in place of the location previously addressed during the last occurrence of this time interval.

The signaling information stored in the addressed location is read out of data RAM 30 and is used in combination with the remaining bits of the information previously read out of the connection RAM 32 to address a unique location in translation RAM 34. That location has stored in it the signaling information to be sent to the CUs 16 in that time slot. It is that signaling information which is read out of translation RAM 34 and stored in CUDL RAM 36 for subsequent transmission to all of the CUs 16. The location in CUDL RAM 36 in which the information is stored identifies it with a particular time slot, i.e. particular CU 16 and therefore with a particular one of CBs 28a to 28m and the associated one of RCUDL's 30a to 30m.

It should be appreciated that it is the provisioning information in connection RAM 32 which determines the particular time slot in which the signaling information for one of the subscribers of system 10 is to be sent to all of the CUs 16. It should also be appreciated that it is the combination of the provisioning information stored in connection RAM 32 and the signaling information received from C.O. end 14 which determines by addressing a location in translation RAM 34 the particular signaling information to be sent to all of the CUs 16 in that time slot. The signaling information received from C.O. end 14 is not sent directly to CUs 16.

It is this interaction between RAMs 30 and 32 which allows receive signaling path 20a of SPU 20 to provide time slot interchanging for the signaling information. It is the interaction between the information stored in RAMs 30 and 32 as well as RAM 34 which allows receive signaling path 20a of SPU 20 to have the capability of adapting to any one of a wide variety of signaling formats which may be used in system 10.

It should be further appreciated that while signaling information is sent continuously from C.O. end 14 to SPU 20 that provisioning and testing information is sent only as needed. Generally, provisioning information is provided only at the time when a CU 16 is first connected to system 10. Thereafter, the provisioning information may be changed if, for example, it is desirable to interchange the time slots. As far as testing information is concerned, that is provided only when C.O. end 14 wishes to test the CUs 16. It should, however, be appreciated that SPU 20 continuously sends signaling information to all of the CUs 16 and in addition, also continuously sends provisioning information to all of the CUs 16. That "new" provisioning information is available for use in each of the CUs 16 for a limited period of time. The provisioning information last sent is either refreshed if unchanged or updated if changed by the new provisioning information.

In summary then, a signal having a multiplicity of time slots each associated with a respective one of the CUs 16 is continually sent to all of the CUs 16 over RCUDL 30a by SPU 20. That signal contains updated signaling information received from C.O. end 14; provisioning information for either refreshing the provisioning information last sent to CUs 16 or for updating that information if the provisioning information has changed; and testing information received from C.O. end 14 when testing is to be performed on one or more of CUs 16. As will be set forth in more detail hereinafter the particular time slot associated with each CU 16 is determined solely by the physical location of the CU in the digroups of CB 28a. Therefore, while all of the CUs 16 receive the signal on RCUDL 30a, each CU reacts only to that part of the signal which is in its associated time slot.

Transmit signaling path 20b of SPU 20 will now be described. It functions in a manner similar to receive signaling path 20a.

The CUs 16 transmit information relating to signaling, provisioning and testing to SPU 20 over TCUDL 31a. That information is transmitted to SPU 20 as a serial bit stream having a predetermined time slot sequence. Serial to parallel converter 39 converts the serial bit stream on TCUDL 31a to the parallel bit stream used on transmit signaling path 20b.

The information is stored in CUDL RAM 38. The location in CUDL RAM 38 in which the information is stored is determined by the physical location of the particular CU 16 from which it was sent. That storage location not only identifies it with having been sent from a particular CU 16 but also with one of CBs 28a to 28m and the associated one of TCUDLs 31a to 31m. As with connection RAM 32, connection RAM 40 includes a lookup table which gives the particular one of the multiplicity of time slots in the digital signal transmitted to C.O. end 14 and multiplicity of LIUs 24a to 24m which are associated with a respective one of the multiplicity of CUs 16. The signaling information transmitted from CUs 16 must be translated into the particular format being used in system 10. That translation is provided by the lookup table contained in translation RAM 42.

As with receive signaling path 20a the information stored in the lookup table of connection RAM 40 and in the lookup table of translation RAM 42 both come from the provisioning information. As described for connection RAM 32, the provisioning information stored in the lookup table of connection RAM 40 functions to determine the interchanging of time slots between those in the signal on TCUDL 31a and those in the signal to be transmitted to C.O. end 14. In this regard CUDL RAM 38 acts as a buffer in a manner similar to that described above for data RAM 30.

More specifically as CPU 22 addresses each location in the connection RAM 40 lookup table the information stored therein is read out. Part of that information is used to address a unique location in CUDL RAM 38. The signaling information stored in the addressed location is then read out in an order determined by the provisioning information stored in connection RAM 40. That signaling information is used in combination with the remaining bits of the information previously read out of connection RAM 40 to address a unique location in translation RAM 42. That location has stored in it the signaling information for one of the subscribers which is to be sent to C.O. end 14 in that time slot.

It is this interaction between RAMs 38 and 40 which allows transmit signaling path 20b of SPU 20 to provide time slot interchanging for the signaling information. It is the interaction between the information stored in RAMs 38 and 40 as well as RAM 42 which allows transmit signaling path 20b of SPU 20 to have the capability of adapting to the wide variety of signaling states which may be used in system 10.

Therefore, SPU 20 has the capability of adapting to the wide variety of signaling states which may be used in system 10. SPU 20 also has the capability of interchanging signaling time slots as desired. Finally, SPU 20 allows provisioning information to be sent from C.O. end 14 to CUs 16 so that the CUs can be provisioned from the central office as desired.

As previously described in connection with FIG. 1, TRU 18 provides an interface between the PCM signals representing voice frequency transmissions to and from the CUs 16 and the order in which those signals are transmitted to or received from C.O. end 14. Therefore, prior to describing CUs 16 in more detail it is first necessary to more fully describe TRU 18.

Figure 4A:
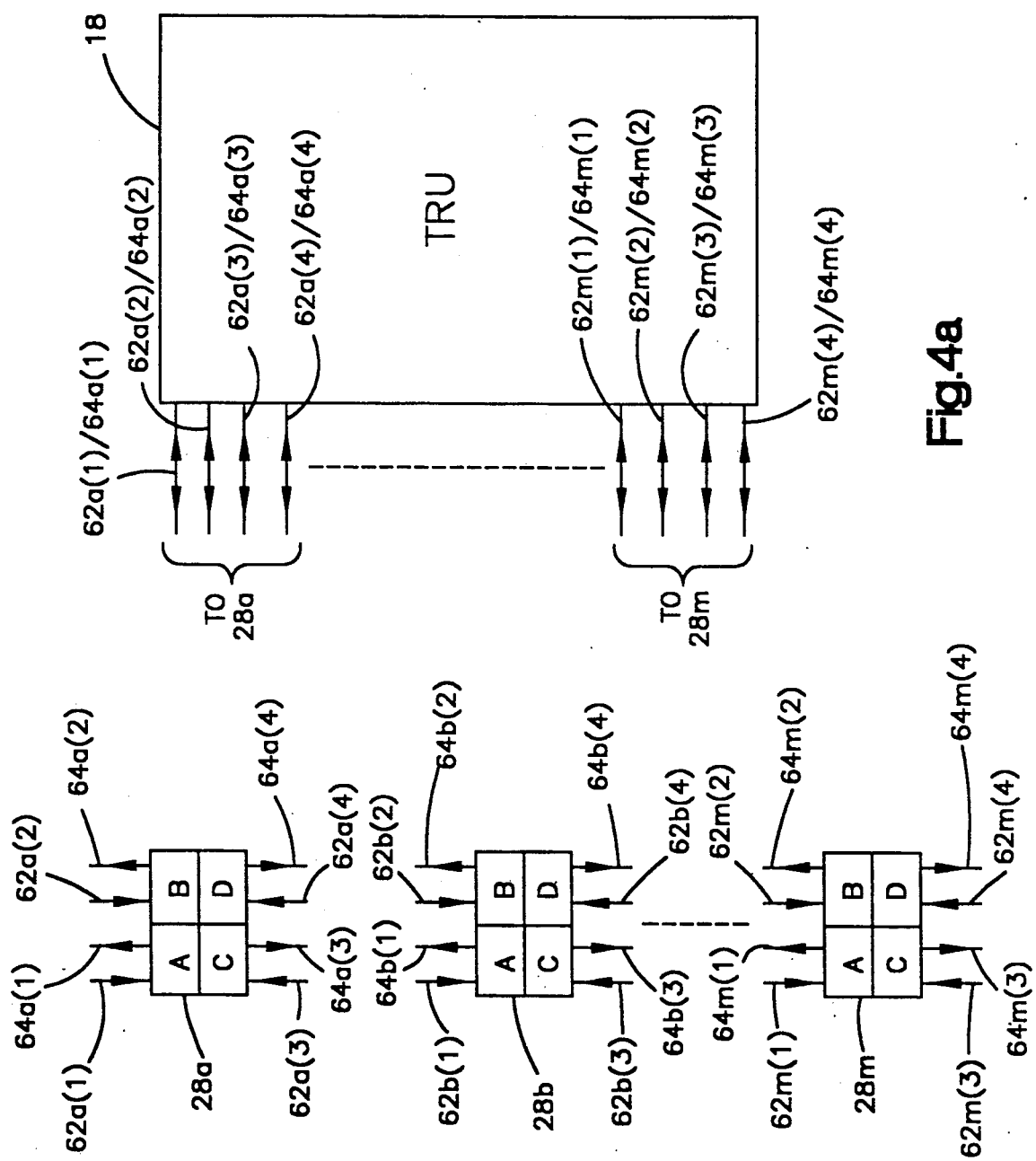
FIG. 4a shows the manner in which the transmit/receive unit (TRU) of the system of the present invention is connected to the channel banks (CBs) of the system of the present invention.

As shown in simplified form in FIG. 4a, TRU 18 is connected to each of the four digroups in each of CBs 28a to 28m by the associated pairs of lines in the two groups of data lines 62a (1 to 4) to 62 m (1 to 4) and 64a (1 to 4) to 64m (1 to 4). Line pair 62a (1), 64a (1) are associated with digroup A of CB 28a, line pair 62a (2), 64a (2) are associated with digroup B of CB 28a etc. Lines 62a (1 to 4) to 62m (1 to 4) are used to carry PCM signals received from C.O. end 14 to the CBs 28a to 28m. Lines 64a (1 to 4) to 64a (1 to 4) are used to carry PCM signals to be transmitted from CBs 28a to 28m to C.O. end 14.

As all of the line pairs function in an identical manner only the function of line pairs 62a (1 to 4), 64a (1 to 4) need be described hereinafter. That is only the line pairs associated with the four digroups A, B, C, D in CB 28a will be described it being understood that the other line pairs function in exactly the same manner with respect to the associated one of the digroups in the associated one of CBs 28b to 28m. In a manner similar to the description of SPU 20 the term CUs 16 when used hereinafter, unless otherwise indicated will refer only to the CUs in the four digroups of CB 28a.

Figure 4B:
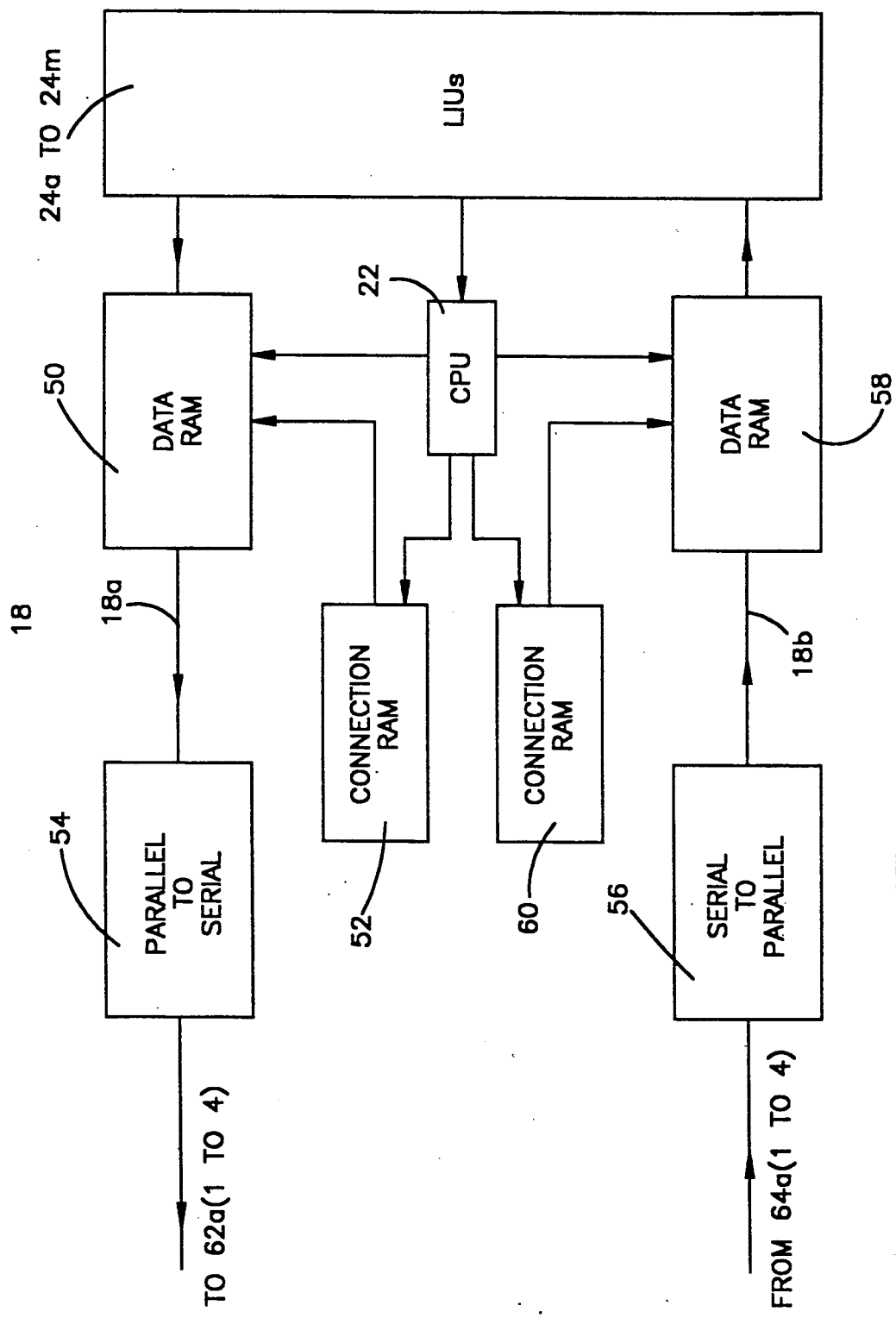
FIG. 4b is a block diagram of the TRU.

Referring now to FIG. 4b there is shown a block diagram for TRU 18. TRU 18, as was the case with SPU 20, may be divided into a receive path 18a associated with the PCM signals received from C.O. end 14 and a transmit path 18b associated with the PCM signals to be transmitted to C.O. end 14. The receive path 18a includes data RAM 50, connection RAM 52 and parallel to serial converter 54. The transmit path 18b includes serial to parallel converter 56, data RAM 58 and connection RAM 60. As was the case with FIG. 3 the various address busses associated with CPU 22 are shown in simplified form in FIG. 4a.

The PCM signals are received from the C.O. end 14 and transmitted thereto in a predetermined time slot order. That order may be different from or the same as the order in which those signals are sent to or from the CUs 16. It is the combination of RAMs 50 and 52 in receive path 18a and RAMs 58 and 60 in transmit path 18b which allow TRU 18 to interchange those time slots for the PCM signals received from C.O. end 14 and the PCM signals to be transmitted to C.O. end 14, respectively. The interchanging of the time slots is accomplished in accordance with the provisioning information stored in lookup tables in RAMs 52 and 60 in the same manner as was described for the signaling information time slot interchanging provided by SPU 20.

The PCM signals are received from C.O. end 14 by LIUs 24a to 24m and are sent to TRU 18 in the form of a parallel bit stream. They are written into data RAM 50 and stored in a location therein determined by the order in which they are received. CPU 22 addresses each location of the lookup table in connection RAM 52 and the provisioning information stored therein is read out. As with SPU 20, part of that information is used to address a location in data RAM 50. That location has stored in it the PCM signal for one of the subscribers of system 10. The provisioning information uniquely identifies that location in RAM 50 and the information stored therein with that subscriber. The CU for that subscriber has a unique address determined by the particular one of CBs 28a to 28m, the particular digroup A, B, C or D in that CB and the card slot in that digroup in which it is located.

The PCM signal is sent to the CUs 16 in CB 28a over the associated one of data lines 62a (1 to 4) in a serial bit stream. Parallel to serial converter 54 provides the necessary conversion. The remaining bits in the provisioning information are used to route the PCM signal over the associated one of lines 62a (1 to 4).

It should be appreciated that the provisioning information stored in RAM 52 determines the interchanging of time slots between those in the PCM signal received from C.O. end 14 and those in the PCM signal to be sent to the CUs in each digroup of CB 28a. In this regard data RAM 50 acts as a buffer.

The PCM signals to be transmitted to C.O. end 14 from the CUs 16 in each digroup in CB 28a arrive at TRU 18 in the form of a serial bit stream having a predetermined time slot sequence over the associated one of data lines 64a (1 to 4). Serial to parallel converter 56 provides the necessary conversion so that the PCM signals are in the parallel bit stream used in transmit path 18b.

The PCM signals are stored in data RAM 58. The particular location in data RAM 58 in which the information is stored is determined by CPU 22 and identifies it as having been sent to TRU 18 from a particular one of the CUs 16 and digroups in CB 28a and therefore with the associated one of the data lines 64a (1 to 4). Connection RAM 60 includes a lookup table which gives the particular one of the multiplicity of time slots in the digital signal transmitted to C.O. end 14 and multiplicity of LIUs 24a to 24m which are associated with that particular CU 16.

As with receive path 18a the information stored in the lookup table of connection RAM 60 comes from the provisioning information. As described for connection RAM 52, the provisioning information stored in the lookup table of connection RAM 60 functions to determine the interchanging of time slots between those in the PCM signals on the associated one of lines 64a (1 to 4) and those in the signals to be transmitted to C.O. end 14. In this regard data RAM 58 acts as a buffer in a manner similar to that described above for data RAM 50.

More specifically, as CPU 22 addresses each location in the connection RAM 60 lookup table the information stored therein is read out. Part of that information is used to address a unique location in data RAM 58. The PCM signal stored in the addressed location is then read out in an order determined by the provisioning information stored in connection RAM 60. It is this interaction between RAMs 58 and 60 which allows transmit path 18b of TRU 18 to provide time slot interchanging for the PCM signals.

In summary, TRU 18 has the capability of interchanging PCM signal time slots as desired. Now that TRU 18 has been fully described it is possible to describe CUs 16 in more detail.

As described previously system 10 includes a multiplicity of CUs 16. A CU 16 may, depending on the configuration of system 10, serve either one or two subscribers. In addition, the particular type of CU 16 used to serve the one or two subscribers depends on the service needed by those subscribers. Therefore, in a given configuration system 10 may include many different types of CUs 16.

All of the CUs 16 must, however, interface with the associated ones of RCUDL 30a to 30m and TCUDL 31a to 31m as well as interface with the associated ones of lines 62a (1 to 4) to 62m (1 to 4) and 64a (1 to 4) to 64m (1 to 4). To that extent each of the CUs 16 must include identical circuitry for interfacing with those lines. That circuitry will be described in connection with FIGS. 5a to 5d.

Before describing that circuitry the flow of the signaling, provisioning and testing information to and from the CUs 16 from and to SPU 20 over data lines 30a to 30m and 31a to 31m will first be described. As the data lines are arranged in pairs, each pair associated with a respective one of CBs 28a to 28m, and are otherwise identical it will only be necessary to describe the flow of information over line pair 30a, 31a.

Signaling, provisioning and testing information is sent to the CUs 16 by SPU 20 over RCUDL 30a and received therefrom over TCUDL 31a continuously in the form of a serial bit stream. A predetermined number of bytes are associated with the information sent to and received from each of the CUs for each of the up to two subscribers served by that CU. For example, there may be six bytes associated with that information for each subscriber. As each of the CUs 16 in digroups A, B, C, D of CB 28a can serve up to two subscribers they will each periodically receive and send two groups of six bytes, i.e. twelve bytes in total, of signaling, provisioning, and testing information. Where the CU serves two subscribers, six of those bytes will be associated with one of those subscribers and the other six bytes will be associated with the other of those two subscribers. Where the CU serves only one subscriber all twelve bytes may contain information for that subscriber.

The order in which those bytes are sent to or from SPU 20 to the CUs 16 in the digroups of CB 28a is primarily a matter of design choice. For example, if each digroup serves up to 24 channels, i.e. has up to 12 CU cards, then the six bytes may be sent in the following sequence:

i) byte 1 of channel 1 in digroup A followed by byte 1 of channel 2 in that digroup etc. so that byte 1 is sent to all 24 channels in the digroup;

ii) byte 2 of channel 1 in digroup A followed by byte 2 of channel 2 in that digroup etc. so that byte 2 is sent to all 24 channels in that digroup;

iii) bytes 3, 4, 5 and 6 for all of the channels in digroup A are then sent in the manner described above for bytes 1 and 2;

iv) the six bytes for all the channels in digroup B are then sent in the sequence described in i) to iii) above followed by the six bytes for all the channels in digroups C and D all sent in that same sequence.

The sequence is then repeated in the manner set forth in i) to iv) above.

Figure 5A:
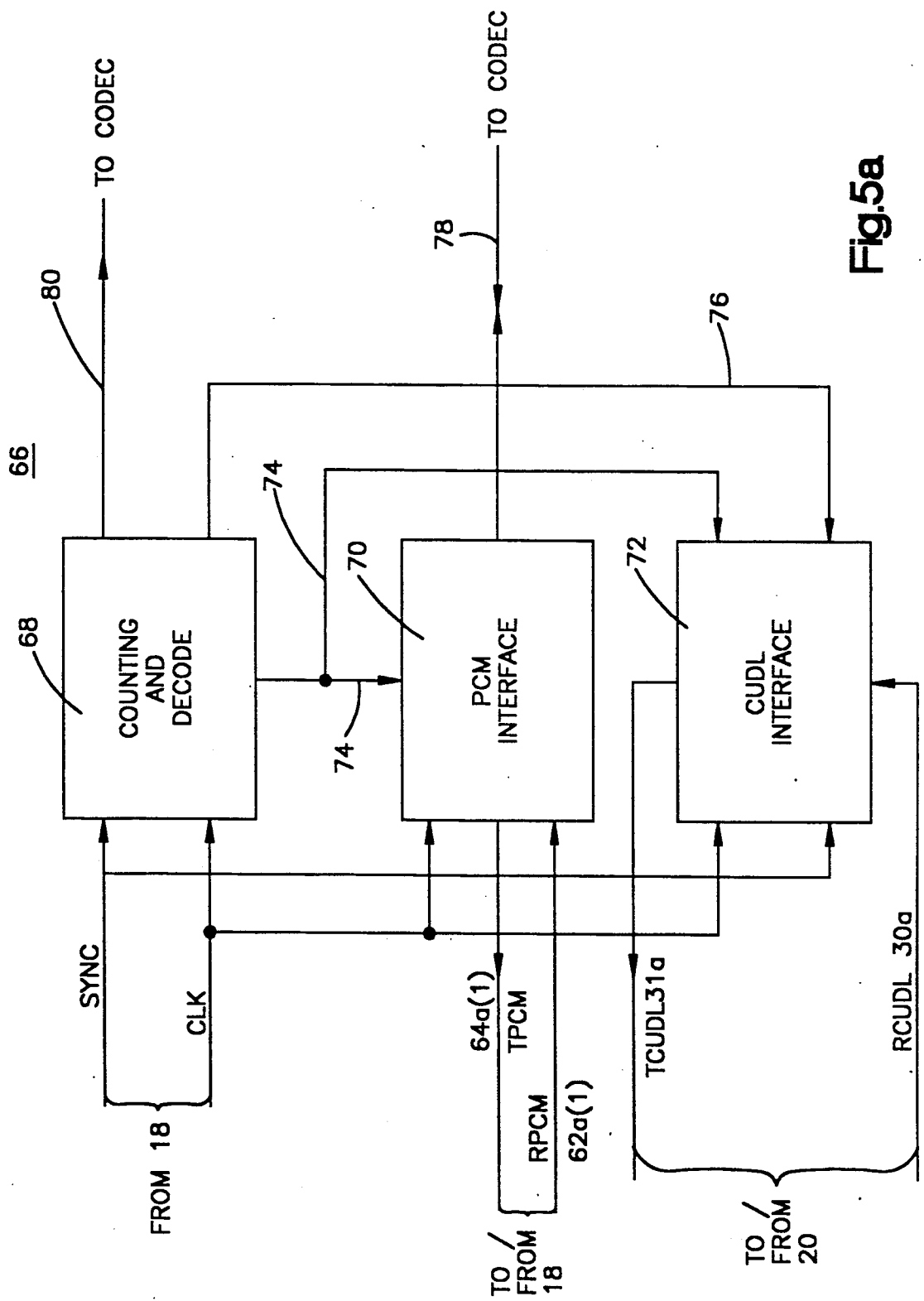
FIG. 5a is a simplified block diagram of the interface circuitry included in each channel unit (CU) used in the system of the present invention.

Referring to FIG. 5a there is shown a simplified block diagram of the circuit 66 included in each CU 16 for interfacing that CU with the associated ones of RCUDLs 30a to 30m and TCUDLs 31a to 31m as well as the associated ones of receive data (PCM) lines 62a (1 to 4) to 62m (1 to 4) and transmit data (PCM) lines 64a (1 to 4) to 64m (1 to 4). For ease of description hereinafter it will be assumed that circuit 66 is on a CU 16 which is located in digroup A of CB 28a and that the CU serves the subscribers connected to the first and second channels of that digroup. It will also be assumed that the digroup serves 24 channels and that there are three other digroups in CB 28a each of which also serve 24 channels. CU 16 is then connected to RCUDL 30a, TCUDL 31a, receive PCM line 62a (1) and transmit PCM line 64a (1).

Circuit 66 includes counting and decode circuit 68, PCM interface circuit 70 and CUDL interface circuit 72. Each of the circuits 68, 70, 72 will be described in connection with the waveforms shown in FIG. 5b. Circuits 68 and 72 will then further be described in connection with FIGS. 5c and 5d, respectively as well as FIG. 5b.

PCM interface circuit 70 is connected to both receive data line 62a (1) which has the PCM signals received from C.O. end 14 for the two subscribers served by CU 16 and transmit data line 64a (1) which has the PCM signals to be transmitted to C.O. end 14 from those two subscribers. To aid in the explanation of circuit 66 the receive PCM signals on line 62a (1) are labeled as RPCM and the transmit PCM signals on line 64a (1) are labeled as TPCM in FIG. 5a. CUDL interface circuit 72 is connected to both RCUDL 30a and TCUDL 31a.

Circuits 68, 70, 72 are all connected to receive a clock (CLK) signal. The CLK signal as shown in FIG. 5b is a periodic signal having a square waveform. It occurs at the rate of 1.544 Mbps. That is the rate at which signals are transmitted on digital transmission lines 26a to 26m.

Subscriber end 12 of system 10 should remain synchronized with C.O. end 14. The central office has a clock signal which is part of the signals received at subscriber end 12 on lines 26a to 26m. LIUs 24a to 24m include a circuit for recovering, in a manner well known in the art, the central office clock signal. One of those recovered clock signals may then be selected for connection to a phase-locked loop (PLL) located at subscriber end 12. The PLL locks on to the recovered central office clock in a manner well known in the art to thereby generate the CLK signal. Alternatively, the CLK signal may be generated by a local oscillator located at the subscriber end 12. This allows for a CLK signal even if subscriber end 12 is disconnected from C.O. end 14. In the system 10 of the present invention, the PLL and local oscillator are located in TRU 18.

Circuits 68 and 72 are also connected to receive a synchronizing (SYNC) signal. The SYNC signal is shown in FIG. 5b and occurs once every three (3) milliseconds. The SYNC signal is generated at subscriber end 12 by dividing the recovered central office clock by 4,632. The SYNC signal resets the counters contained in circuit 68 to thereby provide a starting point for the next interchange of signaling, provisioning and testing information between SPU 20 and all of the CUs 16 in CBs 28a to 28m. As described previously that interchange occurs periodically and it should now be clear that that period is three milliseconds. In other words, every three milliseconds all of the CUs 16 in system 10 will receive from and transmit to SPU 20 "new" signaling, provisioning and testing information. The manner in which the SYNC signal is used in circuit 72 will be described in connection with FIG. 5d.

Before circuit 66 is further described, the transfer of signaling, provisioning, and testing information to and from CU 16 and SPU 20 will first be further described. That description will then be followed by a further description of the transfer of PCM signals to and from CU 16 and TRU 18.

As before, it will be assumed that there are six bytes associated with the signaling, provisioning and testing information for each of the two subscribers served by CU 16. Digroup A of CB 28a (the digroup and CB in which CU 16 is assumed to be located) serves 24 subscribers and CB 28a serves 96 subscribers in total. Therefore every three milliseconds, 96×6 or 576 bytes of signaling, provisioning and testing information is transferred to and from CB 28a and SPU 20.

As CU 16 serves the first and second channels of digroup A it receives and transmits byte 1 (the first byte) for the first channel almost immediately after the SYNC pulse has terminated. As there are separate pairs of RCUDLs and TCUDLs connected between each CB and SPU 20, all of the first channels of digroup A of each of CBs 28a to 28m receive and transmit their first byte at the same time over the associated pairs of R and T CUDLs.

Each byte of signaling, provisioning and testing information on RCUDL 30a and TCUDL 31a contains eight bits and they are shown symbolically in FIG. 5b for the first channel of digroup A. It should be noted that each bit has a time duration equal to the time for one cycle of the CLK signal (approximately 0.65 microseconds). Each byte occupies its own time slot which has a time duration equal to the time to send or receive the eight bits in that byte (approximately 5.2 microseconds). The time slot associated with the first channel of digroup A is also known as the first time slot as it is the one which occurs just after each SYNC pulse. FIG. 5b shows only the waveforms associated with that first time slot.

As previously described the first byte of signaling, provisioning and testing information associated with the first channel of digroup A is followed immediately by the first byte of such information associated with the second channel of digroup A. That second channel may be served by CU 16 as was assumed for the purposes of this description or it may be served by another one of the 12 CUs in digroup A. The particular channels in each digroup A served by each CU is primarily a matter of design choice.

Also as previously described all of the first bytes of such information for all of the 24 channels in digroup A are transferred to and from SPU 20 in succession. In other words, the first 24 time slots after the occurrence of the SYNC pulse are associated with the 24 first bytes transferred to and from the 12 CUs 16 in digroup A. Those 24 bytes constitute in total 192 bits. PCM signals are transferred to and from subscriber end 12 in the form of frames, each of which is capable of transferring the signals for 24 channels. Each frame is made up of 24 eight bit bytes each of which is associated with a respective one of the 24 channels plus one framing bit or 193 bits in total. The time for transferring a frame is 125 microseconds. Therefore, the time to transfer all of the first bytes for the 24 channels in digroup A is essentially equal to the time for one frame.

All of the second, third, fourth, fifth and sixth bytes of information for the 24 channels in digroup A also each take one frame to be transferred. Therefore, it takes six frames to transfer all of the six bytes of information for the 24 channels in digroup A. It also takes six frames each to transfer all of the bytes of information for each of digroups B, C and D. In total it takes 24 frames to transfer all of the bytes of information for all of the CUs in each of CBs 28a to 28m. As each frame is equal in duration to 125 microseconds, the duration of those 24 frames is 3 milliseconds which is the time between occurrences of each SYNC pulse.

The transfer of PCM signals to and from CU 16 and TRU 18 will now be further described. PCM signals are transferred to and from subscriber end 12 and C.O. end 14 over each of the multiplicity of digital transmission lines 26a to 26m in the form of frames. Each frame is capable of transferring the signals for 24 channels. As described above each digroup serves 24 channels. Therefore, each of lines 26a to 26m transfers the PCM signals for an associated one of the digroups.

Each of CBs 28a to 28m has four digroups. In order to transfer all of the PCM signals for the four digroups in each CB, four digital transmission lines must be used. In other words, lines 26a to 26m may be said to be divided into groups of four lines each with each such group being associated with a respective one of CBs 28a to 28m. System 10 has a multiplicity of LIUs 24a to 24m. Each of LIUs 24a to 24m is associated with a respective one of the groups of four digital transmission lines and is therefore associated with a respective one of CBs 28a to 28m.

Each of the 24 channels served by each digroup has its own unique time slot. The PCM signals for those 24 channels are transferred to subscriber end 12 from C.O. end 14 and vice versa in a single frame, i.e. every 125 microseconds. As was described above it was assumed that the first time slot for the 24 channels in digroup A of CB 28a is associated with the first channel in that digroup. The receive PCM (RPCM) signal for that time slot and the transmit PCM (TPCM) signal for that time slot are both shown symbolically in FIG. 5b.

Referring once again to FIG. 5a it is seen that counting and decode circuit 68 is connected by wires 74 to both PCM interface circuit 70 and CUDL interface circuit 72. Circuit 68 is also connected to circuit 72 by other wires 76. As has been described above, CU 16 serves two channels each of which has its associated time slot for receiving and transmitting PCM signals and for receiving and transmitting signaling, provisioning and testing information. Therefore, CU 16 must be told when one of its two time slots is occurring and also which of the two channels it serves is associated with that time slot.

Without that information, the CU would not "know" that there is receive signaling, provisioning and testing information on RCUDL 30a for one of the channels it serves or that this is the time when it should transmit such information for that channel on TCUDL 31a. Without that information the CU would not "know" that there is a receive PCM signal on line 62a (1) for one of the channels it serves or that this is the time when it should transmit a PCM signal for that channel on line 64a (1). That information regarding the occurrence of a time slot and the channel with which it is associated is provided by the signals on wires 74 for PCM interface circuit 70 and by the signals on wires 74 and 76 for CUDL interface circuit 72. The manner in which those signals are generated will be described in connection with FIG. 5c.

There is also shown in FIG. 5a wires 78 which connect PCM interface circuit 70 to a CODEC, i.e. coder-decoder (not shown). A CODEC, as is well known in the art, is used to decode received PCM signals into analog signals and encode analog signals into PCM signals so that they can be transmitted from CU 16 to TRU 18. CODECs are available in integrated circuit chips from a variety of manufacturers as for example the TP3054 type chip available from National Semiconductor Corporation, Santa Clara, Calif.

Wires 78 carry the receive PCM signals for the two channels served by CU 16 from interface circuit 70 to the CODEC and the PCM signals to be transmitted from those two channels to TRU 18 from the CODEC to the interface circuit 70. Those signals contain eight bits, i.e. are one byte, for each of the two channels and are shown symbolically in FIG. 5b for the first channel in digroup A of CB 28a. The receive signal is labeled 78 RCV and the transmit signal is labeled 78 XMIT. As shown in FIG. 5b, the signal 78 XMIT starts one CLK signal cycle before the beginning of the time slot in which it is to be transmitted, i.e. become the TPCM signal and the signal 78 RCV starts one CLK signal cycle after the beginning of the time slot in which it was received at CU 16 as the RPCM signal. As the RPCM and the 78 RCV signals are identical and as the TPCM and the 78 XMIT signals are identical it should be clear that PCM interface circuit 70 introduces a delay to signals passing through it equal to the time for one cycle of the CLK signal.

Finally, circuit 68 is connected by wires 80 to the CODEC. In order to properly perform its function of encoding and decoding PCM signals, the CODEC must know when the 78 RCV and 78 XMIT signals start for each of the two channels served by CU 16. Circuit 68 provides to the CODEC over the wires 80, two pulses for each of the channels served by CU 16. Each pulse has a time duration equal to the time for one cycle of the CLK signal. One pulse occurs during the cycle of the CLK signal immediately before the start of the 78 XMIT signal. That pulse tells the CODEC that the 78 XMIT signal will begin at the end of the pulse. It is shown in FIG. 5b for the first channel served by CU 16 and is labeled FSX. The other pulse occurs during the cycle of the CLK signal immediately before the start of the 78 RCV signal. That pulse tells the CODEC that the 78 RCV signal will begin at the end of the pulse. It is also shown in FIG. 5b for the first channel and is labeled FSR.

Figure 5C:
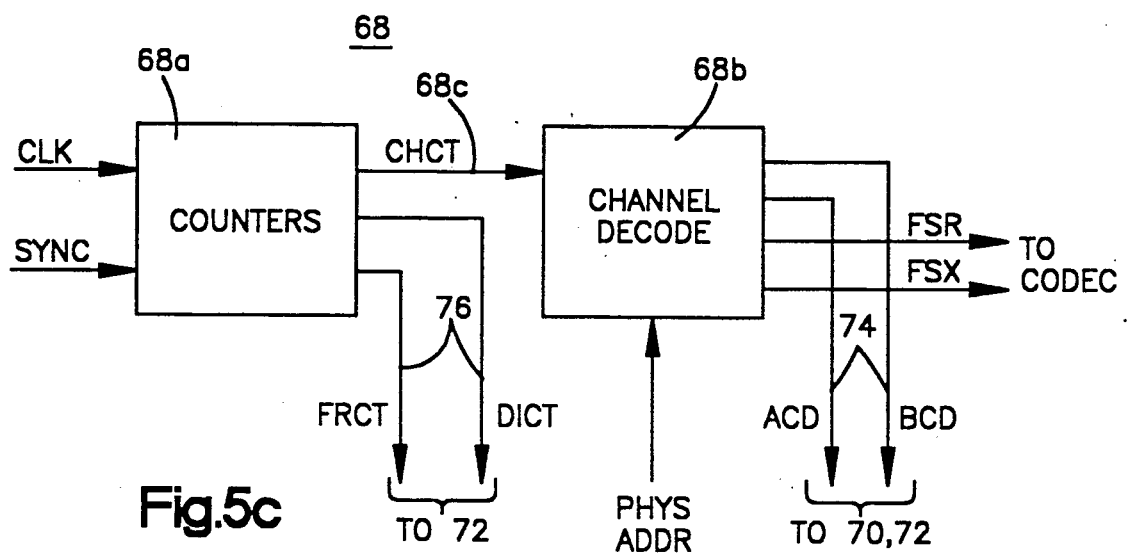
FIG. 5c shows a more detailed block diagram for the counter and decode circuit included in the interface circuitry on each CU.

Referring now to FIG. 5c there is shown a more detailed block diagram for counter and decode circuit 68. Circuit 68 includes counters 68a and channel decode circuit 68b. Counters 68a includes four counters (not shown) and a circuit to detect the occurrence of the SYNC signal.

Each of the four counters in counter 68a will now be described in more detail. The counters are:

i) a three bit counter which counts the eight (8) bits in each time slot;

ii) a five bit counter which counts the 24 time slots that make up each frame. This counter counts a time slot each time the three bit counter described in i) counts the eight bits in each time slot. This counter skips the 193rd bit which occurs at the end of each frame, i.e. after the 24th time slot. The output signal of this counter is the channel count (CHCT) signal and is connected to channel decode circuit 68b over wire 68c;

iii) another three bit counter which counts the six (6) frames associated with the transfer of signaling, provisioning and testing information for the 24 channels in each of the four digroups in CB 28a. The output signal of this counter is the frame count (FRCT) signal and is connected by wires 76 to CUDL interface circuit 72; and iv) a two bit counter which counts the four groups of six frames of signaling, provisioning and testing information associated with each CB. In effect, this counter identifies the digroup with which the information is associated. The output signal of this counter is the digroup count (DICT) signal and is connected by wires 76 to the CUDL interface circuit 72.

It should be appreciated that the four counters described above are all counting occurrences of the CLK signal. In one embodiment of system 10 the counters were clocked by the negative edge of the CLK signal. The occurrence of the SYNC signal resets all of the counters to zero.

The channel decode circuit 68b uses the CHCT signal in combination with a signal on wires 68d which represents the physical address (PHYS ADDR) of the CU 16 on which it is located to generate the signals which appear on wires 74. Each CU 16 has a unique physical address. That address depends solely on the particular card slot in which the CU card is inserted, i.e. its physical location in the digroup. It does not depend on the type of CU card. The address is not encoded on the card.

Each CU card has six pins which receive the address signals from the receptacle into which the card is plugged. In system 10 each CU card receptacle in each digroup is given a unique physical address by grounding appropriate ones of the six contacts in the receptacle associated with the address signals. When a CU card is plugged into that receptacle it "learns" its physical address by decoding the PHYS ADDR signal. While not shown in FIGS. 5a, 5c and 5d, CU 16 uses conventional logic circuitry in a manner well known to those skilled in the art to decode its physical address.

The physical address identifies by number which two of the 24 channels in the digroup the CU 16 serves and also which one of the four digroups in CB 28a that CU 16 is located in. That is part of the information which is decoded by the conventional logic circuitry described above. The CHCT signal is a count of the 24 channels in the digroup as the associated time slots occur. The logic circuitry in circuit 68b (not shown) then simply compares the CHCT signal with the numbers representing the two channels it serves. A first successful comparison will result in the generation of a first channel decode signal on wires 74 and a second successful comparison will result in the generation of a second channel decode signal on wires 74. For ease of description that first channel decode signal is called ACD and the second channel decode signal is called BCD.

For example, the CU 16 being described herein was assumed to serve the first and second channels of digroup A of CB 28a. When the time slot for the first channel occurs the channel decode circuit 68b generates the ACD signal to circuits 70 and 72. When the time slot for the second channel occurs the channel decode circuit 68b generates the BCD signal to circuits 70 and 72.

In a similar manner to the above, circuit 68b also includes decoding circuitry (also not shown) responsive to the occurrence of the CHCT signal and the physical address for generating the FSR and FSX signals.

Figure 5D:
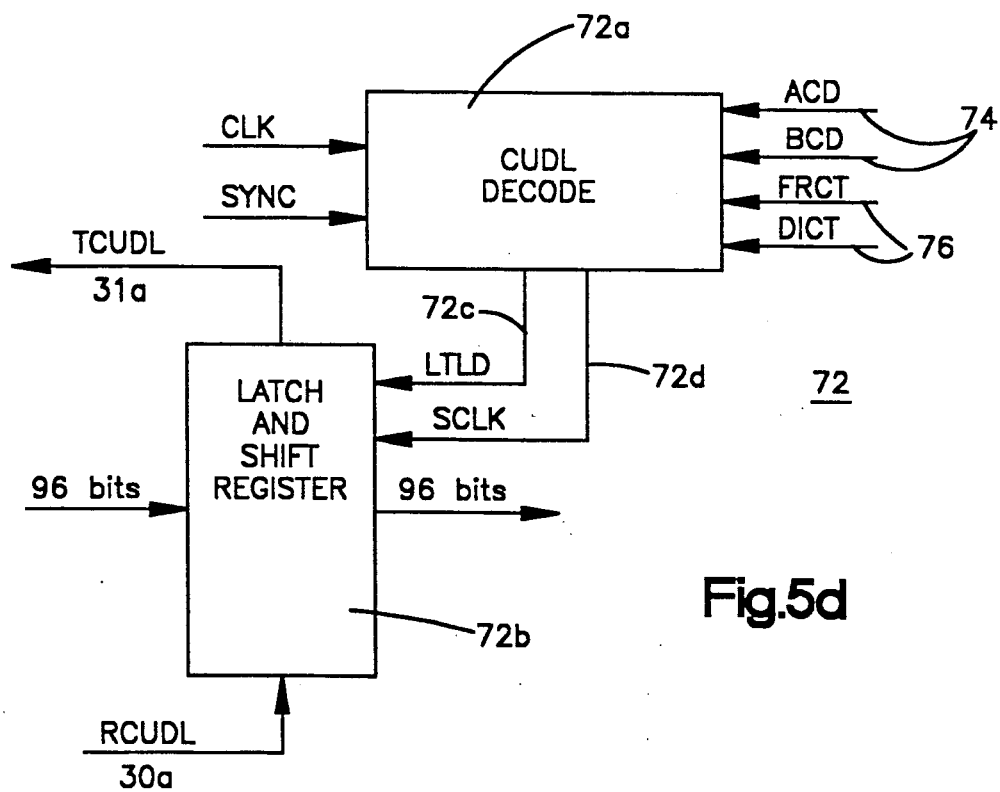
FIG. 5d shows a more detailed block diagram for the channel unit data link interface circuit included in the interface circuitry on each CU.

Referring now to FIG. 5d there is shown a more detailed block diagram for CUDL interface circuit 72. Circuit 72 includes CUDL decode circuit 72a and a latch and shift register circuit 72b. CUDL decode circuit 72a is connected to receive the CLK signal, the SYNC signal, ACD and BCD signals on wires 74 from channel decode circuit 68b and the FRCT and DICT signals on wires 76 from counters 68a.

As described above there are unique time slots associated with each of the two channels served by CU 16. In order that CU 16 receive and transmit signaling, provisioning and testing information for the channels it serves, the CU must "know" when a time slot is occurring for one of the channels it serves and also which of the two channels that time slot is associated with. That information is provided to circuit 72a by the FRCT, DICT, ACD and BCD signals.

The DICT signal identifies the digroup. As has been assumed throughout this description, CU 16 is in digroup A. CUDL decode circuit 72a contains logic circuitry which decodes the DICT signal to thereby provide an enabling input to further logic circuitry when the A digroup is decoded. When the B, C and D digroups are decoded a disabling input is provided to that further logic circuitry.

The FRCT signal identifies the frame. There are six frames associated with the 24 channels in digroup A. The six bytes of signaling, provisioning and testing information for each channel are each associated with a predetermined part of that information. For example, byte 1 may be associated with signaling information, bytes 2 and 3 may be associated with various kinds of provisioning information and so on. Each of the six bytes for each channel served by CU 16 can be identified by the FRCT signal.

The ACD and BCD signals identify that a time slot associated with one of the two channels served by CU 16 is occurring. In this manner, circuit 72 can load into latch and shift register circuit 72b only those bytes on RCUDL 30a associated with the channels the CU 16 serves and transmit on TCUDL 31a only in those time slots associated with those channels.

There are up to 12 bytes of signaling, provisioning and testing information associated with the two channels served by CU 16. Those 12 bytes comprise a total of up to 96 bits. Therefore, latch and shift register circuit 72b must have sufficient capacity to handle all of the information bits associated with the two channels, i.e. latch and shift register circuit 72b must have a capacity of up to 96 bits.

As described above the occurrence of a SYNC pulse every three milliseconds provides a starting point for the next interchange of signaling, provisioning and testing information between CU 16 and SPU 20. When that pulse occurs CUDL decode circuit 72a generates a signal to latch and shift register circuit 72b so that the previously assembled 12 bytes of signaling, provisioning and testing information to be transmitted to SPU 20 in the associated time slots during the three milliseconds can be loaded in the shift register part of circuit 72b. That signal is called the latch load (LTLD) signal and is connected by wires 72c to circuit 72b.

As each time slot associated with the two channels served by CU 16 occurs during the three millisecond time interval, CUDL decode circuit 72a generates a clocking signal to circuit 72b. Circuit 72a generates the clocking signal by gating the CLK signal with the ACD and BCD signals. The clocking signal is called the shift clocking (SCLK) signal and is connected by wire 72d to circuit 72b. As there are eight bits associated with each time slot, eight SCLK signals are provided to circuit 72b for each such time slot. These eight SCLK signals cause the circuit 72b to shift the bits stored therein one position for each occurrence of the eight SCLK signals. The information to be transmitted to SPU 20 is then shifted out of circuit 72b on to TCUDL 31a in groups of eight bits each.

Simultaneously therewith the receive signaling, provisioning and testing information available on RCUDL 30a for that CU 16 during that time slot is shifted into the shift register part of circuit 72b one bit at a time. At the end of each three millisecond time interval all of the bits loaded into the shift register part of circuit 72b at the beginning of the time interval for transmission to SPU 20 have been shifted out of the shift register part of circuit 72b and on to TCUDL 31a. During that time interval the bits associated with the received signaling, provisioning and testing information on RCUDL 30a for that CU 16 have been loaded into the shift register part of circuit 72b. Therefore at the end of the three millisecond time interval the shift register part of circuit 72b contains receive information for the two channels served by CU 16.

Upon the next occurrence of the LTLD signal the receive information is downloaded from the shift register to the latch part of circuit 72b. The information to be transmitted to SPU 20 is then loaded into the shift register part of circuit 72b. It should be appreciated that the downloading of the receive information into the latch part of circuit 72b must occur in time before the loading of the transmit information into the shift register part of circuit 72b.

The use of the signaling, provisioning and testing information received by CU 16 will now be described. The manner in which such information is used depends on the particular type of channel unit card that CU 16 is. That in turn depends on the level of service provided to the subscribes served by CU 16. For example, in one type of channel unit card used in system 10, the provisioning information received at CU 16 is used to control the gain in the transmit and receive directions for each of the two channels served by that CU. That type of channel unit card includes an amplifier having a number of resistors which can be selectively grounded to thereby set and/or change the gain. In one such embodiment of that channel unit type the gain can be set and/or changed in increments of 0.1 db.

Another use of the received provisioning information may be to operate switches on the channel unit card to thereby change the card from one which provides two wire E and M signaling to one which provides four wire E and M signaling. As is well known to those in the art this type of signaling is used in connection with trunk circuits.

One use of the testing information is to allow testing of a particular channel unit card from the C.O. end 14 of system 10. The card may, for example, include two solid state switches one of which is located in shunt relationship between the PCM interface circuit 70 and the CODEC and the other which is located in shunt relationship between the CODEC and the subscribers served by the channel unit card. In normal operation both switches are open. The received testing information may cause the channel unit card to be tested by closing the switch between circuit 70 and the CODEC. In this manner PCM signals sent from C.O. end 14 to the channel unit card are looped back to the C.O. end 14 without going through the CODEC. The received testing information may also cause the channel unit card to be tested by closing the switch located between the CODEC and the subscribers. In this manner, PCM signals received from the C.O. end 14 are decoded by the CODEC and are then looped back to the CODEC to be encoded into PCM signals and transmitted to the C.O. end 14.

The signaling information is used by CU 16 in the conventional manner well known in the art. For example, the received signaling information may indicate that there is a telephone call for either one or both of the two subscribers served by CU 16. Provided that the telephone of the called subscriber is on-hook, the signaling information will cause a ringing generator located on the CU to be connected to ring that subscriber's telephone.

While not shown in FIGS. 5a, c or d it should be obvious that CU 16 must include logic circuitry to decode the various possible combinations of bits in each of the up to six bytes of signaling, provisioning and testing information received at CU 16 for each of the two channels served by CU. The design of that decode circuitry depends on the type of channel unit card that CU 16 is.

There has been described a system 10 in which a subscriber end 12 and a C.O. end 14 are connected to each other by a multiplicity of digital transmission lines 26a to 26m. At each end of the system a multiplicity of LIUs 24a to 24m are connected to the lines 26a to 26m. The digitally encoded signals on each of lines 26a to 26m are transmitted to and received from C.O. end 14 in a serial bit stream at the rate of 1.544 Mbps. As has been previously described and as is well known in the art, these signals are in the form of frames each of which is capable of transferring signals (encoded voice and signaling information) for 24 channels. In each frame there are 24 eight bit bytes each of which is associated with a respective one of the 24 channels. By convention, the least significant bit in each byte in frames 6 and 12 is used to transfer signaling information rather than being used as part of the encoded voice.

As has been previously described each of LIUs 24a to 24m is associated with a respective one of groups of four lines each for lines 26a to 26m. For signals received from C.O. end 14 on the associated group of lines each LIU must include circuitry which separates the signaling information in frames 6 and 12 from the encoded voice, i.e. disassembles the frame. For signals to be transmitted to C.O. end 14 on the associated group of lines, each LIU must include circuitry which combines the signaling information with the encoded voice, i.e. assembles the frames. Such "framing" circuitry may be embodied in the form of an integrated circuit chip, such as the DS 2180 chip available from Dallas Semiconductor, Dallas, Tex, which performs both the assembly and dissassembly of the frames. As each LIU interfaces with four digital transmission lines it includes four such chips, each associated with a respective one of the lines.

It should be appreciated that as on each of lines 26a to 26m signals are transferred in a serial bit stream at the rate of 1.544 Mbps that in order for each LIU to interface with four such lines the framing circuitry must operate at a frequency of 6.176 MHz, i.e. at four times the rate of occurrence of the CLK signal. Therefore, the PLL not only generates the CLK signal but also a clock signal which occurs at a rate which is four times faster then the rate of occurrence of the CLK signal. For ease of description the 6.176 MHz clock signal will be referred to hereinafter as the fast clock (FCLK) signal.

A single transmission line connects all of the LIUs 24a to 24m to TRU 18. All of the LIUs share that transmission line by transferring the PCM signals received from or transmitted to C.O. end 14 in parallel on that line, i.e. all eight bits of each byte are transferred simultaneously. Therefore, each of LIUs 24a to 24m must include a serial to parallel converter for converting PCM signals received from C.O. end 14 from a serial bit stream to parallel prior to transmission to TRU 18 and a parallel to serial converter for converting PCM signals from TRU 18 to a serial bit stream prior to transmission to C.O. end 14.

In a similar manner a single transmission line connects all of the LIUs 24a to 24m to SPU 20. All of the LIUs share that transmission line by transferring the signaling information received from or transmitted to C.O. end 14 in a serial bit stream on that line. It is not necessary for the signaling information to be transmitted in parallel between the LIUs and SPU 20 as the signaling information occurs only in frames 6 and 12 and there is only one bit of signaling information for each of the 24 channels in the frame.

As shown in FIGS. 3 and 4b both TRU 18 and SPU 20 include parallel to serial and serial to parallel converters. All transfer of PCM signals between TRU 18 and the CUs 16 and all transfer of supervisory information, i.e. signaling, provisioning and testing information between SPU 20 and the CUs 16 occurs in the form of a serial bit stream. All transfer of PCM signals between the LIUs and TRU 18 occurs in parallel.

While TRU 18 and SPU 20 have been shown as having separate serial to parallel and parallel to serial converters and while LIUs 24a to 24m have been described as having such separate converters it should be appreciated that both such converters may be embodied by a single converter which simultaneously performs both conversions. One embodiment for such a converter is shown in FIG. 6. That embodiment is described for a single converter 80 which is assumed to be located in TRU 18. In describing that converter it is assumed that system 10 has seven LIUs each of which are connected by an associated one of seven groups of four digital transmission lines each to C.O. end 14, i.e. system 10 has 28 digital transmission lines 26a to 26m. System 10 may also include one or more spare LIUs which are each capable of being connected to any one of the seven groups of four lines each.

As has been described TRU 18 is connected by four lines to each of CBs 28a to 28m. Each of the four lines are associated with a respective one of the four digroups in each CB. In describing converter 80 it is assumed that system 10 has seven CBs, i.e. 28 lines are used to connect all of the CBs to TRU 18.

Referring now to FIG. 6 there is shown a block diagram for converter 80. Converter 80 has a multiplicity of horizontal shift registers 82 and a multiplicity of vertical shift registers 84. The registers 82 and 84 are in separate layers (not shown) with the horizontal registers 82 being in one layer and the vertical registers being in the other layer. For ease of illustration, converter 80 is shown in FIG. 6 with only two horizontal and two vertical shift registers 82, 84.

The horizontal shift registers 82 are connected between a multiplicity of inputs 80a and a multiplicity of outputs 80b of converter 80. Inputs 80a are connected to the associated one of the 28 PCM data lines 64a(1 to 4) to 64m(1 to 4) over which PCM signals to be transmitted from CBs 28a to 28m to C.O. end 14 are carried. Outputs 80b are connected to the associated one of the 28 PCM data lines 62a(1 to 4) to 62m(1 to 4) over which PCM signals received from C.O. end 14 for CBs 28a to 28m are carried. Converter 80 then has 28 horizontal shift registers 82 each associated with a respective one of the pairs of data lines 62a(1), 64a(1) to 62m(4), 64m(4). Each horizontal register has an eight bit capacity.

The vertical shift registers 84 are connected between the multiplicity of inputs 80c and the multiplicity of outputs 80d of converter 80. Inputs 80c and outputs 80d are both connected to the transmission line between TRU 18 and all of the LIUs over which the encoded voice PCM signals received at the LIUs from C.O. end 14 or to be transmitted by the LIUs to C.O. end 14 are transferred in parallel. Each of the inputs 80c and the outputs 80d are associated with a respective one of the eight bits. Converter 80 then has eight vertical shift registers 84 each of which has a 28 bit capacity.

As has been previously described, PCM signals are transferred between TRU 18 and all of the CUs 16 in a serial bit stream. In converter 80, transmit PCM signals from all of the CUs 16 are then clocked into the 28 horizontal shift registers 82 one bit at a time at the rate of 1.544 Mbps. Receive PCM signals from C.O. end 14 for all of the CUs 16 are clocked out of the 28 horizontal shift registers 82 one bit at a time at the same rate.

As has been previously described, PCM signals are transferred between TRU 18 and all of the LIUs 24a to 24m in parallel. In converter 80, receive PCM signals from all of the LIUs, i.e. from C.O. end 14 are clocked into the eight vertical shift registers 84 by the FCLK signal one byte at a time at the rate of 6.176 Mbps. Transmit PCM signals from TRU 18 to all of the LIUs are clocked out of the eight vertical shift registers 84 by the FCLK signal one byte at a time at the rate of 6.176 Mbps.

The flow of PCM signals into and out of converter 80 will now be described. For ease of description it will be assumed that all of the horizontal and vertical registers 82, 84 are initially empty. PCM signals are received at the seven LIUs from the C.O. end 14 on the 28 transmission lines. The eight bits that constitute the byte received in the first time slot on each of the 28 lines are transferred in parallel in a predetermined order to TRU 18 at the rate of 6.176 Mbps.

As has been previously described receive path 18a of TRU 18 performs the necessary time slot interchanging for those signals. This interchanging is also performed at the rate of 6.176 Mbps. The time slot interchanged (TSI'd) receive PCM signals then arrive at inputs 80c of converter 80 one byte at a time at the rate of 6.176 Mbps. The TSI'd receive PCM signals are clocked into the eight vertical shift registers 84 at that rate.

As each of the 28 TSI'd bytes are clocked into registers 84 the previously clocked in bytes are shifted one location in each of the registers 84 closer to outputs 80d of converter 80. Each register 84 has a 28 bit capacity. At the end of the time for one time slot (about 5.2 microseconds) all 28 bytes received from C.O. end 14 have been clocked into the eight registers 84 with the first such byte occupying the location in the registers closest to outputs 80d and the last such byte occupying the location in the registers closest to inputs 80c. Actually, all 28 bytes have been clocked into registers 84 before the time for one time slot has elapsed. The eight bits in each byte are clocked into registers 84 every 0.162 microseconds (the inverse of 6.176 Mbps). It takes 28 cycles of the FCLK signal (about 4.5 microseconds) to clock in all 28 bytes. The time for one time slot to occur is equal to 32 cycles of the FCLK signal. During the last four cycles of the FCLK signal in each time slot no further shifting takes place in registers 84.

Simultaneously, the PCM signals from CUs 16 for transmission to C.O. end 14 have been clocked into horizontal shift registers 82. Those signals appear at inputs 80a of converter 80 and are clocked into registers 82 at the rate of 1.544 Mbps, i.e., one bit is clocked into registers 82 every 0.65 microseconds (the inverse of 1.544 Mbps). At the end of the time for one time slot all eight bits that are the first byte in the transmit PCM signals are in registers 82 with the first bit in each byte occupying the location closest to outputs 80b of converter 80. Therefore, at the end of the time for one time slot the receive TSI'd PCM signals for transmission to the CUs and the transmit PCM signals from the CUs have been loaded into converter 80.

Outputs 80d of converter 80 are connected to the transmission line over which eight bits are simultaneously transferred in parallel to the LIUs for transmission to C.O. end 14. Outputs 80b of converter 80 are connected to the 28 data lines [62a(1 to 4) to 62m(1 to 4)] over which serial bit streams are transferred to the CUs. The horizontal registers 82 are connected between inputs 80a and outputs 80b. The vertical registers 84 are connected between inputs 80c and outputs 80d. At the end of each time slot the contents of the vertical registers 84 should go to the CUs and the contents of the horizontal registers 82 should go to the LIUs. To accomplish that result the contents of the two sets of registers 82, 84 are "flipped" at the end of each time slot, i.e. the contents of registers 82 are placed in registers 84 and the contents of registers 84 are placed in registers 82.

During the next time slot new PCM signals for transmission to C.O. end 14 are clocked into horizontal shift registers 82 one bit at a time at the rate of 1.544 Mbps. At the same time the contents of those registers at the beginning of this time slot are shifted out one bit at a time at the same rate. As a result of the flipping described above, the contents of those registers at the beginning of this next time slot are TSI'd PCM signals received in the last time slot. Therefore during each time slot as new PCM signals for transmission to C.O. end 14 are clocked into registers 82 at inputs 80a, the PCM signals received from C.O. end 14 in the previous time slot are clocked out of registers 82 at outputs 80b for transmission to the CUs.

Also during this next time slot, i.e. the time slot described above, new TSI'd PCM signals received from C.O. end 14 are clocked into registers 84 one byte at a time at the rate of 6.176 Mbps. At the same time the contents of those registers at the beginning of this next time slot are clocked out one byte at a time at the same rate. As a result of the flipping described above the contents of those registers at the beginning of this next time slot are PCM signals for transmission to C.O. end 14 transmitted from the CUs 16 during the last time slot. Therefore during each time slot as new TSI'd PCM signals received from C.O. end 14 are clocked into registers 84 at inputs 80c, the PCM signals transmitted from the CUs 16 during the last time slot are clocked out of registers 84 at outputs 80d for time slot interchanging in TRU 18 and subsequent transmission to C.O. end 14.

It should be appreciated that in system 10, TRU 18 provides time slot interchanging in both the receive and transmit directions for the PCM signals representing encoded voice. The ability of TRU 18 to provide that time slot interchanging in the receive direction results from the information stored in connection RAM 52 and in the transmit direction results from the information stored in connection RAM 60. It should also be appreciated that in system 10, SPU 20 provides time slot interchanging in both the receive and transmit directions for the signaling information. The ability of SPU 20 to provide that time slot interchanging in the receive direction results from the information stored in connection RAM 32 and in the transmit direction results from the information stored in connection RAM 40. It should further be appreciated that in system 10, SPU 20 also provides interchanging of signaling state formats in both the transmit and receive directions for the signaling information. The ability of SPU 20 to provide that interchanging of signaling state formats in the receive direction results from the information stored in translation RAM 34 and in the transmit direction results from the information stored in translation RAM 42.

There is given below a listing for the routines contained in CPU 22 for performing various calculations relating to the time slot interchanging described above. The listing has a total of 12 pages. While CPU 22 may have to execute additional software to accomplish the functions described above, listings for that software are not included. The form that that software should take would, in view of that description, be obvious to one skilled in the art.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

```
/****************************************************************
 *                                                              *
 *     Function:      back_calc_x_pcm_value                     *
 *     Description:   This function reverse calculates the      *
 *                    transmit PCM value.                       *
 *                                                              *
 ****************************************************************/
back_calc_x_pcm_value( // )
unsigned int value,
unsigned char *chan_bank,
unsigned char *digroup,
unsigned char *channel
)
{   /*  Begin back_calc_x_pcm_value */
    if (value < 0x23)
       value += 0x2dd;
    else
       value -= 0x23;

*chan_bank = value & 0x07;
    *digroup = (value >> 3) & 0x03;

value = (value >> 4) & 0x3e;
```

```
       if (value > 0x17)
           value -= 0x17;

*channel = value;
    } /* End back_calc_x_pcm_value */

/****************************************************************************
 *                                                                          *
 *              Function:      back_calc_x_signal_value                     *
 *              Description:   This function reverse calculates the         *
 *                             transmit Signal value.                       *
 *                                                                          *
 ****************************************************************************/
back_calc_x_signal_value( // )
unsigned int value,
unsigned char *chan_bank,
unsigned char *digroup,
unsigned char *channel
)
{  /* Begin back_calc_x_signal_value */
    *chan_bank = (value >> 7) & 0x07;
    *digroup = (value >> 5) & 0x03;
    *channel = value & 0x1f;
} /* End back_calc_x_signal_value */

/****************************************************************************
 *                                                                          *
 *              Function:      calc_r_cudl_address                          *
 *              Description:   This function calculates the receive         *
 *                             CUDL address.                                *
 *                                                                          *
 ****************************************************************************/
calc_r_cudl_address ( // )
unsigned char chan_bank,
unsigned char digroup,
unsigned char slot,
unsigned long int *address
)
{ /* Begin calc_r_cudl_address */
   unsigned long int base_address;

base_address = (slot * 16) + (digroup * 256) + (chan_bank * 1024);
   base_address = base_address + R_CUDL_BASE;
   *address = base_address;
} /* End calc_r_cudl_address */

/****************************************************************************
 *                                                                          *
 *              Function:      calc_r_pcm_address                           *
 *              Description:   This function calculates the receive         *
 *                             PCM address.                                 *
 *                                                                          *
 ****************************************************************************/
calc_r_pcm_address( // )
unsigned char chan_bank,
unsigned char digroup,
unsigned char channel,
unsigned long int *address
)
{  /* Begin calc_r_pcm_address */
    unsigned long int base_address;

if (channel % 2)
       channel += 23;
    channel /= 2;
```

```
    base_address = (channel * 64) + (digroup * 16) + (chan_bank * 2);
    base_address += R_PCM_BASE;

if (base_address >= R_PCM_LIMIT)
        base_address -= R_PCM_ADJUSTMENT;

*address = base_address;
}  /* End calc_r_pcm_address */

/***********************************************************************
*                                                                      *
*           Function:     calc_r_pcm_ts_address                        *
*           Description:  This function calculates the receive         *
*                         PCM address.                                 *
*                                                                      *
***********************************************************************/
calc_r_pcm_ts_address( // )
unsigned char chan_bank,
unsigned char digroup,
unsigned char channel,
unsigned long int *address
)
{
    unsigned long int base_address;

base_address = (channel * 64) + (digroup * 16) + (chan_bank * 2);
    base_address += R_PCM_BASE;

if (base_address >= R_PCM_LINIT)
        base_address -= R_PCM_ADJUSTMENT;

*address = base_address;
}

/***********************************************************************
*                                                                      *
*           Function:     calc_r_pcm_value                             *
*           Description:  This function calculates the receive         *
*                         PCM value.                                   *
*                                                                      *
***********************************************************************/
calc_r_pcm_value( // )
unsigned line_unit,
unsigned lu_span,
unsigned ds1_ts,
unsined int *value
)
{
    *value = lu_span + (line_unit * 4) + (ds1_ts * 32) + 37;

if (*value == R_PCM_VALUE_LIMIT) *value = 0;
    if (*value > R_PCM_VALUE_LIMIT) *value = *value - R_PCM_VALUE_ADJUSTMENT;
}

/***********************************************************************
*                                                                      *
*           Function:     calc_r_signal_address                        *
*           Description:  This function calculates the receive         *
*                         signalling address.                          *
*                                                                      *
***********************************************************************/
calc_r_signal_address( // )
unsigned char chan_bank,
unsigned char digroup,
unsigned char channel,
unsigned long int *address
```

```
)
{
    unsigned long int base_address;

base_address = (channel * 2) + (digroup * 64) + (chan_bank * 256);
    base_address += R_SIGNAL_BASE;

*address = base_address;
}

/***************************************************************************
*                                                                          *
*           Function:     calc_r_signal_value                              *
*           Description:  This function calculates the receive             *
*                         signalling value.                                *
*                                                                          *
***************************************************************************/
calc_r_signal_value( // )
unsigned line_unit,
unsigned lu_span,
unsigned ds1_ts,
unsined int *value
)
{
    *value = (lu_span * 32) + (line_unit * 128) + ds1_ts;
}

/***************************************************************************
*                                                                          *
*           Function:     calc_r_xlate_address                             *
*           Description:  This function calculates the receive             *
*                         translation address.                             *
*                                                                          *
***************************************************************************/
calc_r_xlate_address( // )
unsigned char chan_bank,
unsigned char digroup,
unsigned char slot,
unsigned long int *address
)
{
    unsigned long int base_address;

base_address = (slot * 16) + (digroup * 256) + (chan_bank * 1024);
    base_address += R_XLATE_BASE;

*address = base_address;
}

/***************************************************************************
*                                                                          *
*           Function:     calc_r_xlate_chan_address                        *
*           Description:  This function calculates the receive             *
*                         translation address.                             *
*                                                                          *
***************************************************************************/
calc_r_xlate_chan_address( // )
unsigned char chan_bank,
unsigned char digroup,
unsigned char channel,
unsigned long int *address
)
{
    unsigned long int base_address;
```

```
    base_address = (channel * 8) + (digroup * 256) + (chan_bank * 1024);
    base_address += R_XLATE_BASE;

*address = base_address;
}

/******************************************************************
 *                                                                 *
 *           Function:     calc_x_cudl_address                     *
 *           Description:  This function calculates the transmit   *
 *                         CUDL address.                           *
 *                                                                 *
 ******************************************************************/
calc_x_cudl_address( // )
unsigned char chan_bank,
unsigned char digroup,
unsigned char slot,
unsigned long int *address
)
{
    unsigned long int base_address;

base_address = (slot * 16) + (digroup * 256) + (chan_bank * 1024);
    base_address += X_CUDL_BASE;

*address = base_address;
}

/******************************************************************
 *                                                                 *
 *           Function:     calc_x_pcm_address                      *
 *           Description:  This function calculates the transmit   *
 *                         PCM address.                            *
 *                                                                 *
 ******************************************************************/
calc_x_pcm_address( // )
unsigned char line_unit,
unsigned char lu_span,
unsigned char ds1_ts,
unsigned long int *address
)
{
    unsigned long int base_address;

base_address = (ds1_ts * 64) + (lu_span * 2) + (line_unit * 8);
    base_address +=  X_PCM_BASE;
    if (base_address >= X_PCM_LIMIT)
       base_address = base_address - X_PCM_ADJUSTMENT;

*address = base_address;
}

/******************************************************************
 *                                                                 *
 *           Function:     calc_x_pcm_value                        *
 *           Description:  This function calculates the transmit   *
 *                         PCM value.                              *
 *                                                                 *
 ******************************************************************/
calc_x_pcm_value( // )
unsigned char chan_bank,
unsigned char digroup,
unsigned char channel,
unsigned int *value
)
```

```
{
    if (channel % 2)
        channel += 23;
    channel /= 2;

*value = (channel * 32) + (digroup * 8) + chan_bank + 35;
    if (*value >= X_PCM_VALUE_LIMIT)
        *value -= X_PCM_VALUE_ADJUSTMENT;
}

/****************************************************************
 *                                                              *
 *           Function:     calc_x_signal_address                *
 *           Description:  This function calculates the transmit*
 *                         signalling address.                  *
 *                                                              *
 ****************************************************************/
calc_x_signal_address( // )
unsigned char line_uint,
unsigned char lu_span,
unsigned char ds1_ts,
unsigned long int *address
)
{
    unsigned long int base_address;

base_address = (ds1_ts * 2) + (lu_span * 64) + (line_unit * 256);
    base_address += X_SIGNAL_BASE;

*address = base_address;
}

/****************************************************************
 *                                                              *
 *           Function:     calc_x_signal_value                  *
 *           Description:  This function calculates the transmit*
 *                         signalling value.                    *
 *                                                              *
 ****************************************************************/
calc_x_signal_value( // )
unsigned char chan_bank,
unsigned char digroup,
unsigned char channel,
unsigned int *value
)
{
    *value = (chan_bank * 128) + (digroup * 32) + (channel);
}

/****************************************************************
 *                                                              *
 *           Function:     calc_x_xlate_address                 *
 *           Description:  This function calculates the transmit*
 *                         translation address.                 *
 *                                                              *
 ****************************************************************/
calc_x_xlate_address( // )
unsigned char chan_bank,
unsigned char digroup,
unsigned char slot,
unsigned long int *address
)
{
    unsigned long int base_address;
```

```
    base_address = (slot * 16) + (digroup * 256) + (chan_bank * 1024);
    base_address += X_XLATE_BASE;

*address = base_address;
}

/******************************************************************************
 *                                                                            *
 *           Function:     calc_x_xlate_chan_address                          *
 *           Description:  This function calculates the transmit              *
 *                         translation address.                               *
 *                                                                            *
 ******************************************************************************/
calc_x_xlate_chan_address( // )
unsigned char chan_bank,
unsigned char digroup,
unsigned char channel,
unsigned long int *address
)
{
    unsigned long int base_address;

base_address = (slot * 8) + (digroup * 256) + (chan_bank * 1024);
    base_address += X_XLATE_BASE;

*address = base_address;
}

/******************************************************************************
 *                                                                            *
 *           Function:     check_good_for_line_unit(line_unit)                *
 *                                                                            *
 ******************************************************************************/
int check_good_for_line_unit(char line_unit)
{
    unsigned int rt_id, sane;

if (SYSTEM_STATUS.COT)
        {
        if (!(ALARMS.COT_STATUS.LU_SANITY[line_unit]))
            sane = 1;
        else
            sane = 0;
        }
    else
        {
        rt_id = SYSTEM_STATUS.DEVICE_ID;
        if (!(ALARMS.RT_STATUS[rt_id].LU_SANITY[line_unit]))
            sane = 1;
        else
            sane = 0;
        } if ((SYSTEM_STATUS.EQUIPPED.LU_EQUIPPED[line_unit]) && sane)
        return(1);
    else
        return(0);
}

/******************************************************************************
 *                                                                            *
 *           Function:     compare_mem()                                      *
 *           Description:  This function compares two memory arrays,          *
 *                         byte for byte.  Returns TRUE if both com-          *
 *                         pare, FALSE otherwise.                             *
 *                                                                            *
 ******************************************************************************/
compare_mem(char *from_block, char *to_block, int count)
```

```
{
    while (count--)
        {
            if (*(to_block++) != *(from_block++))
                return (FALSE);
        }
    return(TRUE);
}

/*********************************************************************
 *                                                                    *
 *           Function:       config_span                              *
 *           Description:    This function sends a span configuration *
 *                           message to LU transmit task.             *
 *                                                                    *
 *********************************************************************/
config_span(span)
int span;
{
    int err;
    struct HEADER *msg_block;

if (!SYSTEM_STATUS.ON_LINE)
        return;

do
        {
            msg_block = (struct HEADER *)sc_gblock(part_3_id, &err);
            if (err)
                sc_tdelay(10L);
        }
    while (err);

msg_block->PART_ID = part_3_id;
    msg_block->SEND_NODE.DEVICE_TYPE = my_node_type;
    msg_block->SEND_NODE.DEVICE_ID = my_node_id;
    msg_block->REC_NODE.DEVICE_TYPE = my_node_type;
    msg_block->REC_NODE.DEVICE_ID = my_node_id;
    msg_block->SEND_TASK = sys_config_ctrl_id;
    msg_block->REC_TASK = lui_xmt_id;
    msg_block->LEN_OF_DATA = 13;
    msg_block->FUNC_CODE = CONFIG_SPAN;
    msg_block->DATA[0] = span;

sc_lock();
    msg_block->DATA[1] = SPAN_INIT_CTRL[span].SPAN_CONFIG;
    msg_block->DATA[2] = SPAN_INIT_CTRL[span].COT_RT;
    msg_block->DATA[3] = SPAN_INIT_CTRL[span].DIGROUP;
    msg_block->DATA[4] = SPAN_INIT_CTRL[span].ECC_1;
    msg_block->DATA[5] = SPAN_INIT_CTRL[span].ECC_2;
    msg_block->DATA[6] = SPAN_INIT_CTRL[span].ECC_3;
    msg_block->DATA[7] = SPAN_INIT_CTRL[span].B8ZS
    msg_block->DATA[8] = SPAN_INIT_CTRL[span].BIT7_STUFFING;
    msg_block->DATA[9] = SPAN_INIT_CTRL[span].LIU_LENGTH;
    msg_block->DATA[10] = SPAN_INIT_CTRL[span].R_CLOCK;
    msg_block->DATA[11] = SPAN_INIT_CTRL[span].SLIP_MONITORING;
    sc_unlock();

route_msg(msg_block);

if (SPAN_STATUS_CTRL[span].PROTECTION_STATUS == SPAN_ON_PROTECT)
        led_format(ACTIVATE_LU_LEDS, span, PROT);
}
```

What is claimed is:

1. In a digital transmission system for providing service to a multiplicity of subscribers by a multiplicity of channel units, said system having two terminals interconnected to each other by transmission means, said transmission means carrying supervisory and nonsupervisory information for each of said channel units from one of said terminals to the other of said terminals and from said other terminal to said one terminal, said one terminal comprising:

at least one channel bank having one or more of said channel units, each of said channel units associated with a predetermined number of said subscribers;

interface means connected to said transmission means for receiving said supervisory and nonsupervisory information from said other terminal to said one terminal and for transmitting to said other terminal said supervisory and nonsupervisory information from said one terminal;

a first single data line connected between said interface means and said at least one channel bank, said first single data line for carrying from said interface means to said at least one channel bank all of said supervisory information from said other terminal for said at least one channel bank and not for carrying from said interface means to said at least one channel bank any of said nonsupervisory information from said other terminal for said at least one channel bank; and a second single data line connected between said interface means and said at least one channel bank, said second single data line for carrying from said at least one channel bank to said interface means all of said supervisory information from said at least one channel bank for said other terminal and not for carrying from said at least one channel bank to said interface means any of said nonsupervisory information from said at least one channel bank for said other terminal.

2. The one terminal of claim 1 further comprising:

another channel bank having another one or more of said channel units, each of said channel units associated with a predetermined number of said subscribers;

a third single data line connected between said interface means and said another channel bank, said third single data line for carrying from said interface means to said another channel bank all of said supervisory information from said other terminal for said another channel bank and not for carrying from said interface means to said another channel bank any of said nonsupervisory information from said other terminal for said another channel bank; and a fourth single data line connected between said interface means and said another channel bank, said fourth single data line for carrying from said another channel bank to said interface means all of said supervisory information from said another channel bank for said other terminal and not for carrying from said another channel bank to said interface means any of said nonsupervisory information from said another channel bank for said other terminal.

3. The one terminal of claim 1 wherein said supervisory information includes signaling information for said subscribers and said interface means comprises:

first means connected to said transmission means for receiving said signaling information in a first information sequence order from said other terminal and for transmitting to said other terminal said signaling information in said first information sequence order; and second means connected between said first means and said first and second single data lines for interchanging said signaling information from said other terminal from said first information sequence order to a second information sequence order and said signaling information for said other terminal from said second information sequence order to said first information sequence order, said first single data line carrying in said second information sequence order all of said signaling information for said at least one channel bank and said second single data line carrying in said second information sequence order all of said signaling information from said at least one channel bank.

4. The one terminal of claim 3 wherein said first means receives said signaling information from said other terminal in a first format and transmits said signaling information to said other terminal in said first format and said first data line carries all of said signaling information for said of at least one channel bank in a second format and said second data line carries all of said signaling information from said at least one channel bank in said second format and said second means also for converting all of said signaling information for said at least one channel bank from said first format to said second format and all of said signaling information from said at least one channel bank from said second format to said first format.

5. The one terminal of claim 1 wherein said nonsupervisory information and said supervisory information are carried on said transmission means as digital signals having a predetermined transmission bit rate, said one terminal interface means is also for generating signals related to said bit rate from said digital signals.

6. The one terminal of claim 5 further comprising means connected between said interface means and said at least one channel bank for carrying from said interface means to said at least one channel bank said bit rate related signals and wherein each of said at least one channel units comprises:

means responsive to said bit rate related signals for determining when supervisory information related to each of said predetermined number of said subscribers is occurring on said first data line and for which one of said subscribers and generating signals indicative thereof; and interface means connected to said first data line responsive to said signals indicative of when related supervisory information is occurring and for which one of said subscribers and said bit rate related signals for selecting from said first data line only supervisory information related to each of said predetermined number of said subscribers.

7. The one terminal of claim 6 wherein each of said channel unit 3 interface means is also connected to said second data line and is responsive to said supervisory information indicative signals for placing on said second data line all of said supervisory information related to said predetermined number of subscribers served by said channel unit.

8. The one terminal of claim 1 wherein said supervisory information includes signaling information for said subscribers and said interface means comprises:

first means connected to said transmission means for receiving said signaling information in a first format from said other terminal and for transmitting to said other terminal said signaling information in said first format; and second means connected between said first means and said first and said second single data lines for converting all of said signaling information from said other terminal from said first format to a second format and all of said signaling information for said other terminal from said second format to said first format, said first single data line carrying in said second format all of said signaling information for said at least one channel bank and said second single data line carrying in said second format all of said signaling information from said at least one channel bank.

9. The one terminal of claim 8 wherein said supervisory information also includes said second format information, said converting means including means for storing said second format information therein.

10. The one terminal of claim 9 wherein said interface means further comprises means responsive to said second format information for controlling said converting means storage means for storing said second format information therein.

11. The one terminal of claim 3 wherein said supervisory information also includes said second order information, said second means including means for storing said second order information therein.

12. The one terminal of claim 11 wherein said interface means further comprises means responsive to said second order information for controlling said second means storage means for storing said second order information therein.

13. In a digital transmission system for providing service to a multiplicity of subscribers, each of said subscribers having an associated predetermined format for signaling information which may be different from each other, said system having two terminals interconnected to each other by transmission means, said transmission means carrying for all of said subscribers signaling information from one of said terminals to the other of said terminals, said transmission means carried signaling information having for each of said subscribers an associated format which may be different than said predetermined format associated with each of said subscribers, said other terminal comprising:

a) interface means connected to said transmission means for receiving all of said signaling information carried on said transmission means;

b) means responsive to all of said transmission means carried signaling information received by said interface means for translating for each of said subscribers said transmission means carried signaling information format associated with each of said subscribers to said predetermined signaling information format associated with each of said subscribers; and c) means connected between said translating means and all of said subscribers for carrying from said translating means to all of said subscribers all of said received signaling information in said associated predetermined format.

14. The other terminal of claim 13 wherein said translating means comprises:

i) a data storage means having a multiplicity of locations each associated with a respective one of said subscribers, each of said locations storing for said associated subscriber said associated predetermined format; and ii) means responsive to said transmission means carried signaling information for each one of said multiplicity of subscribers for addressing said associated respective one of said data storage means multiplicity of locations to read out said associated predetermined format stored therein.

15. The other terminal of claim 14 wherein said means connected between said translating means and all of said subscribers also carries from all of said subscribers to said translating means signaling information in said associated predetermined format transmitted from all of said subscribers and said translating means is responsive to all of said subscriber transmitted signaling information for translating for each of said subscribers said transmitted predetermined signaling format associated with each of said subscribers to said transmission means carried signaling information format associated with each of said subscribers.

16. The other terminal of claim 13 wherein each of said subscribers also have an associated predetermined time slot for said signaling information and said transmission means carried signaling information also has for each of said subscribers an associated time slot which may be different from said predetermined time slot and said translating means is also responsive to all of said signaling information for interchanging for all of said subscribers said transmission means carried signaling information time slot associated with each of said subscribers to said predetermined time slot associated with each of said subscribers and said means connected between said translating means and all of said subscribers also carries to all of said subscribers said received signaling information in said predetermined time slot associated with each of said subscribers.

17. The other terminal of claim 13 further comprising:

i) a multiplicity of channel units for serving said multiplicity of subscribers; and ii) a channel bank having one or more of said channel units, each of said channel units associated with a predetermined number of said subscribers;

and said means connected between said translating means and all of said subscribers includes a first data line connected between said translating means and said at least one channel bank for carrying to said at least one channel bank all of said received signaling information for said at least one channel bank in said associated predetermined format.

18. The other terminal of claim 15 further comprising:

i) a multiplicity of channel units for serving said multiplicity of subscribers; and ii) a channel bank having one or more of said channel units, each of said channel units associated with a predetermined number of said subscribers;

and said means connected between said translating means and all of said subscribers comprises:

i) a first data line connected between said translating means and said at least one channel bank for carrying to said at least one channel bank all of said received signaling information for said at least one channel bank in said associated predetermined format; and ii) a second data line connected between said translating means and said at least one channel bank for carrying from said at least one channel bank all of said transmitted signaling information from said at least one channel bank in said associated predetermined format.

19. In a digital transmission system for providing service to a multiplicity of subscribers, each of said subscribers having an associated predetermined time slot for signaling information and an associated predetermined time slot for nonsupervisory information, said system having two terminals interconnected to each other by transmission means, said transmission means carrying for all of said subscribers signaling and nonsupervisory information from one of said terminals to the other of said terminals, said transmission means carried signaling information having for each of said subscribers an associated time slot which may be different than said predetermined signaling information time slot associated with each of said subscribers and said transmission means carried nonsupervisory information having for each of said subscribers an associated time slot which may be different from said predetermined nonsupervisory information time slot associated with each of said subscribers, said other terminal comprising:
a) interface means connected to said transmission means for receiving all of said signaling and nonsupervisory information carried on said transmission means for all of said subscribers;
b) means responsive to all of said transmission means carried signaling and nonsupervisory information received by said interface means for interchanging for all of said subscribers:
 i) said transmission means carried signaling information time slot associated with each of said subscribers to said predetermined signaling information time slot associated with each of said subscribers; and
 ii) said transmission means carried nonsupervisory information time slot associated with each of said subscribers to said predetermined nonsupervisory information time slot associated with each of said subscribers; and
c) means connected between said interchanging means and all of said subscribers for carrying from said interchanging means to all of said subscribers all of said received signaling information in said associated predetermined time slot for signaling information and not for carrying from said interchanging means to all of said subscribers any of said received nonsupervisory information.

20. The other terminal of claim 19 wherein said interchanging means comprises:
 i) first means responsive only to all of said received signaling information for interchanging for each of said subscribers said transmission means carried signaling information time slot associated with each of said subscribers to said predetermined signaling information time slot associated with each of said subscribers; and
 ii) second means responsive only to all of said received nonsupervisory information for interchanging for each of said subscribers said transmission means carried nonsupervisory information time slot associated with each of said subscribers to said predetermined nonsupervisory information time slot associated with each of said subscribers.

21. The other terminal of claim 20 wherein each of said subscribers also has an associated predetermined format for said signaling information and said transmission means carried signaling information also has for each of said subscribers an associated format which may be different from said predetermined format and said first interchanging means is also responsive to all of received signaling information for translating for all of said subscribers said transmission means carried signaling information format for each of said subscribers to said predetermined signaling information format associated with each of said subscribers and said means connected between said interchanging means and all of said subscribers also carries to all of said subscribers said received signaling information in said predetermined format associated with each of said subscribers.

22. The other terminal of claim 21 further comprising:
 i) a multiplicity of channel units for serving said multiplicity of subscribers; and
 ii) a channel bank having one or more of said channel units, each of said channel units associated with a predetermined number of said subscribers;
 and said means connected between said interchanging means and all of said subscribers comprises a first data line connected between said first interchanging means and said at least one channel bank for only carrying to said at least one channel bank all of said received signaling information for said at least one channel bank in said associated predetermined format and in said associated predetermined time slot.

23. In a digital transmission system for providing service to a first multiplicity of subscribers by a first multiplicity of channel units, each of said channel units associated with a predetermined number of said subscribers, said system having two terminals interconnected to each other by transmission means, said transmission means carrying supervisory and nonsupervisory information for each of said first multiplicity of subscribers as digital signals having a predetermined transmission bit rate from one of said terminals to the other of said terminals, said other terminal including:
 i) interface means connected to said transmission means for receiving said supervisory and nonsupervisory information from said one terminal to said other terminal, said interface means responsive to said digital signals for generating signals related to said bit rate;
 ii) a first single data line connected between said interface means and all of said first multiplicity of channel units for carrying from said interface means to all of said first multiplicity of channel units all of said supervisory information from said one terminal for each of said first multiplicity of subscribers and not for carrying from said interface means to all of said first multiplicity of channel units any of said nonsupervisory information from said one terminal for each of said multiplicity of subscribers; and
 iii) means connected between said interface means and all of said first multiplicity of channel units for carrying from said interface means to said first multiplicity of channel units said bit rate related signals,
 each of said first multiplicity of channel units comprising:

a) means responsive to said bit rate related signals for determining when supervisory information related to each of said predetermined number of said first multiplicity of subscribers is occurring on said first single data line and for which one of said subscribers and generating signals indicative thereof; and b) interface means connected to said first single data line responsive to said signals indicative of when supervisory related information is occurring and for which one of said subscribers and said bit rate related signals for selecting from said first single data line only supervisory information related to each of said predetermined number of said first multiplicity of subscribers served by said channel unit.

24. The channel unit of claim 23 wherein said transmission means also carries supervisory and nonsupervisory information from each of said first multiplicity of channel units from said other terminal to said one terminal and said other terminal also includes a second single data line connected between said interface means and all of said first multiplicity of channel units, said second single data line for carrying from all of said first multiplicity of channel units to said interface means all of said supervisory information from each of said first multiplicity of subscribers for said one terminal and not for carrying from all of said first multiplicity of channel units to said interface means any of said nonsupervisory information from all of said first multiplicity of subscribers for said one terminal, and each of said first multiplicity of channel units interface means is also connected to said second data line and is responsive to said indicative signals for placing on said second data line all of said supervisory information related to said predetermined number of said first multiplicity of subscribers served by said channel unit.

25. The channel unit of claim 23 wherein said other terminal also includes a first transmission line connected between said interface means and all of said first multiplicity of channel units for carrying from said interface means to all of said first multiplicity of channel units all of said nonsupervisory information from said one terminal for each of said first multiplicity of channel units and not for carrying from said interchanging means to all of said first multiplicity of channel units any of said supervisory information from said one terminal for each of said first multiplicity of channel units, and wherein for each of said channel units i) said means responsive to said bit rate related signals also for determining when nonsupervisory information related to each of said predetermined number of said first multiplicity of subscribers is occurring on said first transmission line and for which one of said subscribers and generating signals indicative thereof; and ii) said interface means is also connected to said first transmission line and is also responsive to said signals indicative of when nonsupervisory information is occurring and for which one of said subscribers and said bit rate related signals for selecting from said first transmission line only nonsupervisory information related to each of said predetermined number of said first multiplicity of subscribers served by said channel unit.

26. In the system of claim 25 wherein said system provides service to a second multiplicity of subscribers by a second multiplicity of channel units, each of said second multiplicity of channel units associated with a predetermined number of said second multiplicity of subscribers, said transmission means also carrying as said digital signals having said predetermined bit rate supervisory and nonsupervisory information for each of said second multiplicity of subscribers from said one terminal to said other terminal, said other terminal interface means also for receiving said supervisory and nonsupervisory information for said second multiplicity of subscribers from said one terminal to said other terminal and said other terminal means for carrying said bit rate related signals from said interface means to said first multiplicity of channel units also for carrying said bit rate related signals to said second multiplicity of channel units and said other terminal further including a second single data line connected between said interface means and all of said second multiplicity of channel units for carrying from said interface means to all of said second multiplicity of channel units all of said supervisory information from said one terminal for each of said second multiplicity of subscribers and not for carrying from said interface means to all of said second multiplicity of channel units any of said nonsupervisory information from said one terminal for each of said second multiplicity of subscribers, each of said second multiplicity of channel units comprising:

a) means responsive to said bit rate related signals for determining when supervisory information related to each of said predetermined number of said second multiplicity of subscribers is occurring on said second single data line and for which one of said subscribers and generating signals indicative thereof; and b) interface means connected to said second single data line responsive to said signals indicative of when supervisory related information is occurring and for which one of said subscribers and said bit rate related signals for selecting from said second single data line only supervisory information related to each of said predetermined number of said second multiplicity of subscribers served by said second channel unit.

27. In a digital transmission system for providing service to a multiplicity of subscribers by a multiplicity of channel units, said system having two terminals interconnected to each other by transmission means, said transmission means carrying supervisory and nonsupervisory information for each of said multiplicity of subscribers as digital signals having a predetermined transmission bit rate from one of said terminals to the other of said terminals, said other terminal including:

i) at least one channel bank having one or more of said channel units, each of said channel units associated with a predetermined number of said subscribers;

ii) interface means connected to said transmission means for receiving said supervisory and nonsupervisory information from said one terminal to said other terminal, said interface means responsive to said digital signals for generating signals related to said bit rate;

iii) a first single data line connected between said interface means and said at least one channel bank for carrying from said interface means to said at least one channel bank all of said supervisory information from said one terminal for each of said subscribers served by said at least one channel bank and not for carrying from said interface means to said at least one channel bank any of said nonsupervisory information from said one terminal for each of said subscribers served by said at least one channel bank; and iv) means connected between said interface means and said at least one channel bank for carrying from said interface means to said at least one channel bank said bit rate related signals, each of said one or more channel units comprising:
a) means responsive to said bit rate related signals for determining when supervisory information related to each of said predetermined number of said subscribers is occurring on said first single data line and for which one of said subscribers and generating signals indicative thereof; and
b) interface means connected to said first single data line responsive to said signals indicative of when supervisory related information is occurring and for which one of said subscribers and said bit rate related signals for selecting from said first single data line only supervisory information related to each of said predetermined number of said subscribers served by said channel unit.

* * * * *